US011881034B2

(12) United States Patent
Takemura et al.

(10) Patent No.: US 11,881,034 B2
(45) Date of Patent: Jan. 23, 2024

(54) PROCESSING DEVICE

(71) Applicant: HITACHI ASTEMO, LTD., Hitachinaka (JP)

(72) Inventors: Masayuki Takemura, Tokyo (JP); Takeshi Shima, Hitachinaka (JP); Haruki Matono, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/791,753

(22) PCT Filed: Dec. 25, 2020

(86) PCT No.: PCT/JP2020/048700
§ 371 (c)(1),
(2) Date: Jul. 8, 2022

(87) PCT Pub. No.: WO2021/171776
PCT Pub. Date: Sep. 2, 2021

(65) Prior Publication Data
US 2023/0051270 A1 Feb. 16, 2023

(30) Foreign Application Priority Data
Feb. 25, 2020 (JP) .................. 2020-029596

(51) Int. Cl.
*G06V 20/56* (2022.01)
*G06V 10/44* (2022.01)
(Continued)

(52) U.S. Cl.
CPC .......... *G06V 20/588* (2022.01); *G06V 10/443* (2022.01); *G06V 10/7515* (2022.01);
(Continued)

(58) Field of Classification Search
CPC .... G06V 20/588; G06V 20/647; G06V 20/58; G06V 20/64; G06V 10/443;
(Continued)

(56) References Cited

U.S. PATENT DOCUMENTS

| 2013/0129148 A1* | 5/2013 | Nanri | G08G 1/166 |
| | | | 382/103 |
| 2015/0242695 A1* | 8/2015 | Fan | G08G 1/14 |
| | | | 382/103 |
| 2015/0332114 A1* | 11/2015 | Springer | G06F 18/24 |
| | | | 348/148 |

FOREIGN PATENT DOCUMENTS

| CN | 103837139 A | * | 6/2014 | ............... B60R 1/00 |
| CN | 104520894 A | * | 4/2015 | ............... B60R 1/00 |

(Continued)

OTHER PUBLICATIONS

Li, Qingguang, Ming Yao, Xun Yao, and Bugao Xu. "A real-time 3D scanning system for pavement distortion inspection." Measurement Science and Technology 21, No. 1 (2009): 015702. (Year: 2009).*
(Continued)

*Primary Examiner* — Carol Wang
(74) *Attorney, Agent, or Firm* — Foley & Lardner LLP

(57) ABSTRACT

Erroneous detection due to erroneous parallax measurement is suppressed to accurately detect a step present on a road. An in-vehicle environment recognition device 1 includes a processing device that processes a pair of images acquired by a stereo camera unit 100 mounted on a vehicle. The processing device includes a stereo matching unit 200 that measures a parallax of the pair of images and generates a parallax image, a step candidate extraction unit 300 that extracts a step candidate of a road on which the vehicle travels from the parallax image generated by the stereo matching unit 200, a line segment candidate extraction unit 400 that extracts a line segment candidate from the images
(Continued)

acquired by the stereo camera unit 100, an analysis unit 500 that performs collation between the step candidate extracted by the step candidate extraction unit 300 and the line segment candidate extracted by the line segment candidate extraction unit 400 and analyzes validity of the step candidate based on the collation result and an inclination of the line segment candidate, and a three-dimensional object detection unit 600 that detects a step present on the road based on the analysis result of the analysis unit 500.

12 Claims, 18 Drawing Sheets

(51) Int. Cl.
*G06V 10/74* (2022.01)
*G06V 10/75* (2022.01)
*G06V 20/64* (2022.01)
*G08G 1/16* (2006.01)
*H04N 13/225* (2018.01)

(52) U.S. Cl.
CPC .......... *G06V 10/761* (2022.01); *G06V 20/647* (2022.01); *G08G 1/167* (2013.01); *H04N 13/225* (2018.05)

(58) Field of Classification Search
CPC .. G06V 10/7515; G06V 10/761; G08G 1/167; H04N 13/225; G06T 2207/10012; G06T 2207/30252; G06T 2207/30261; G06T 7/593
See application file for complete search history.

(56) References Cited

FOREIGN PATENT DOCUMENTS

| DE | 35 31 728 A1 | | 3/1986 | |
| EP | 2 669 844 A2 | | 12/2013 | |
| JP | 2000-331148 A | | 11/2000 | |
| JP | 2013134609 A | * | 7/2013 | |
| JP | 2014-006885 A | | 1/2014 | |
| JP | 2016081525 A | * | 5/2016 | ......... G06K 9/00791 |
| JP | 2018-200190 A | | 12/2018 | |
| JP | 2019-148889 A | | 9/2019 | |
| JP | 2019-212154 A | | 12/2019 | |

OTHER PUBLICATIONS

Nan, Zhixiong, Ping Wei, Linhai Xu, and Nanning Zheng. "Efficient lane boundary detection with spatial-temporal knowledge filtering." Sensors 16, No. 8 (2016): 1276. (Year: 2016).*

Yun, Hyeong-Seok, Tae-Hyeong Kim, and Tae-Hyoung Park. "Speed-bump detection for autonomous vehicles by lidar and camera." Journal of Electrical Engineering & Technology 14 (2019): 2155-2162. (Year: 2019).*

Office Action issued in corresponding Indian Patent Application No. 202217039751 with English Machine Translation dated Dec. 21, 2022 (7 pages).

International Search Report with English Translation and Written Opinion in International Application PCT/JP/2020/047800 dated Mar. 30, 2021.

* cited by examiner

FIG. 9
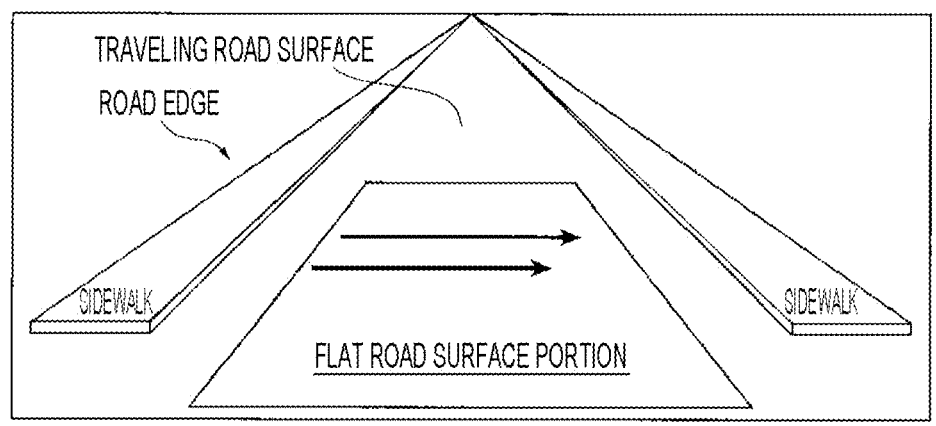
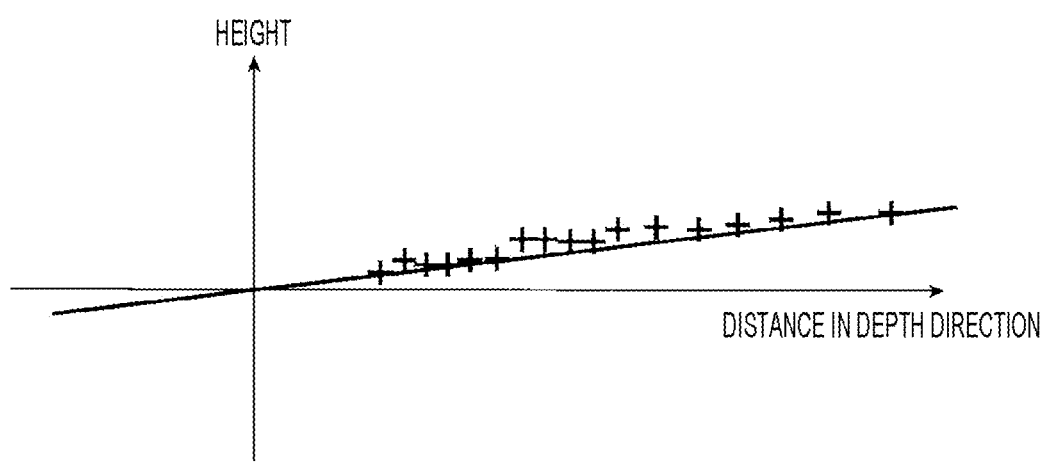

FIG. 10
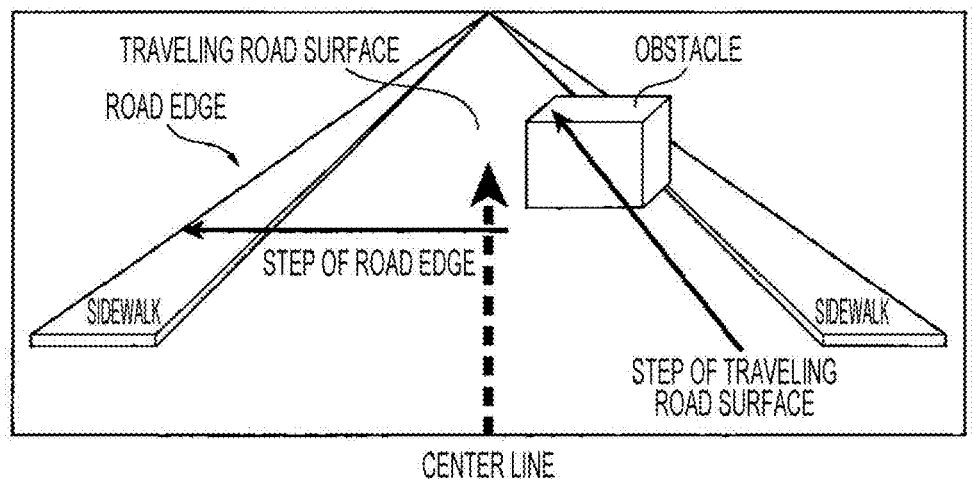
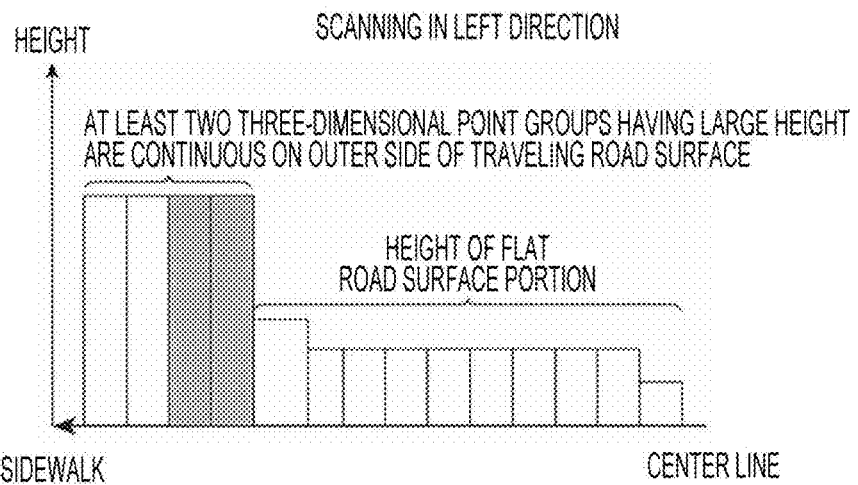
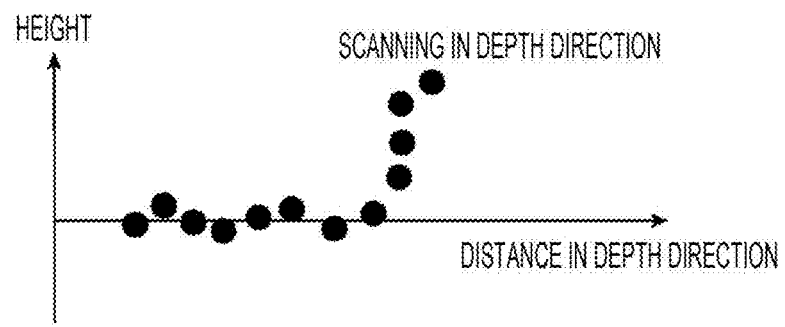

FIG. 14
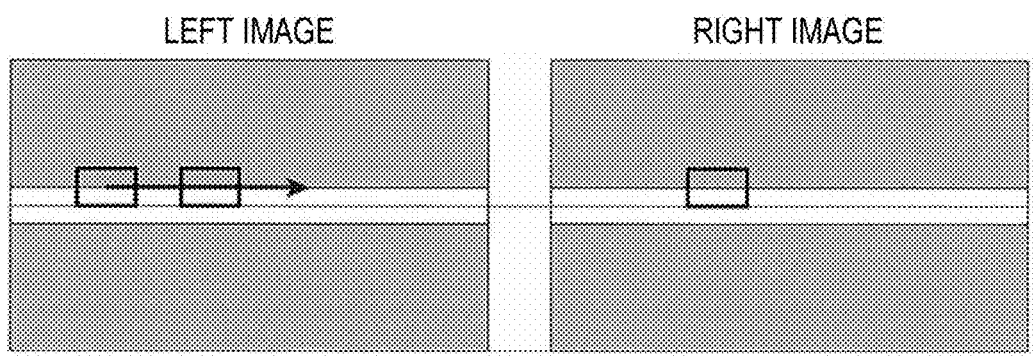
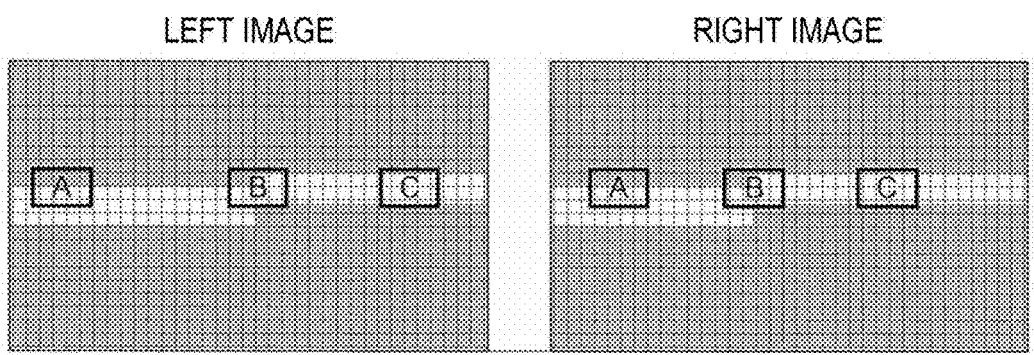

FIG. 15
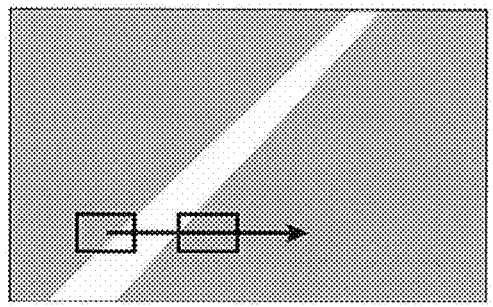
LEFT IMAGE
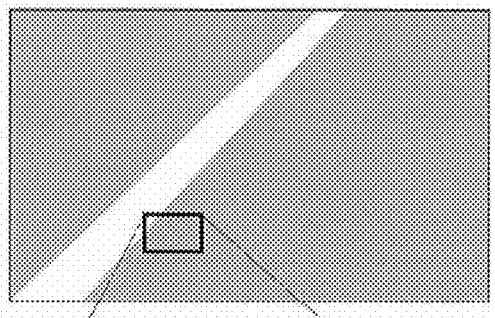
RIGHT IMAGE
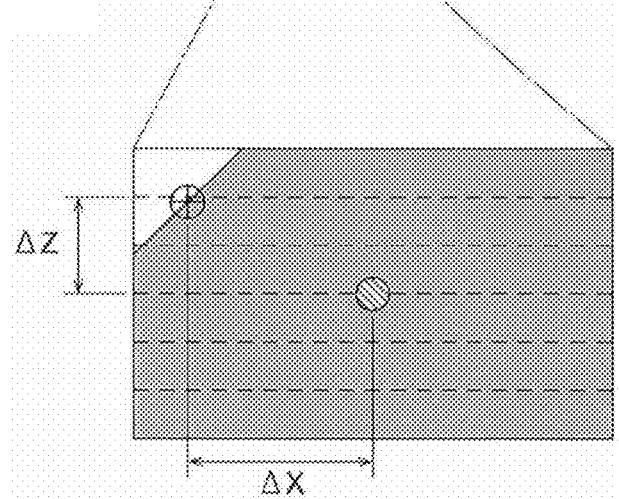
ERROR: LARGE
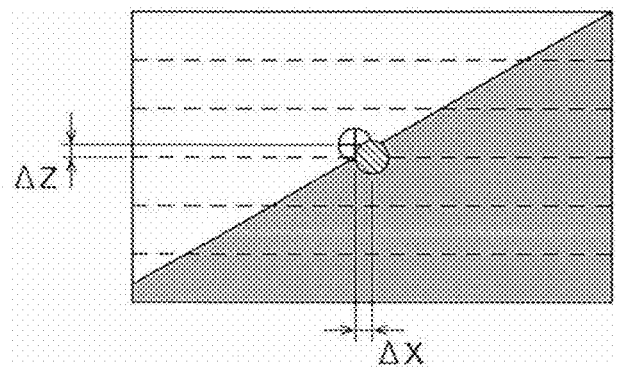
ERROR: SMALL FIG. 16
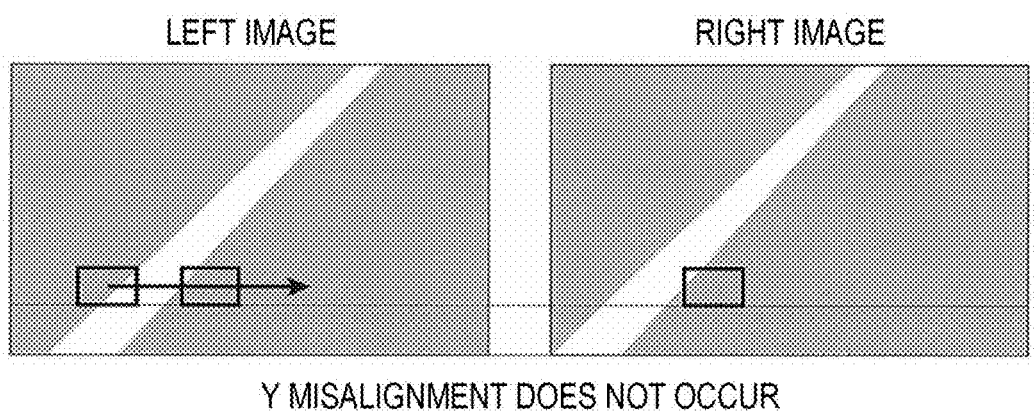
Y MISALIGNMENT DOES NOT OCCUR
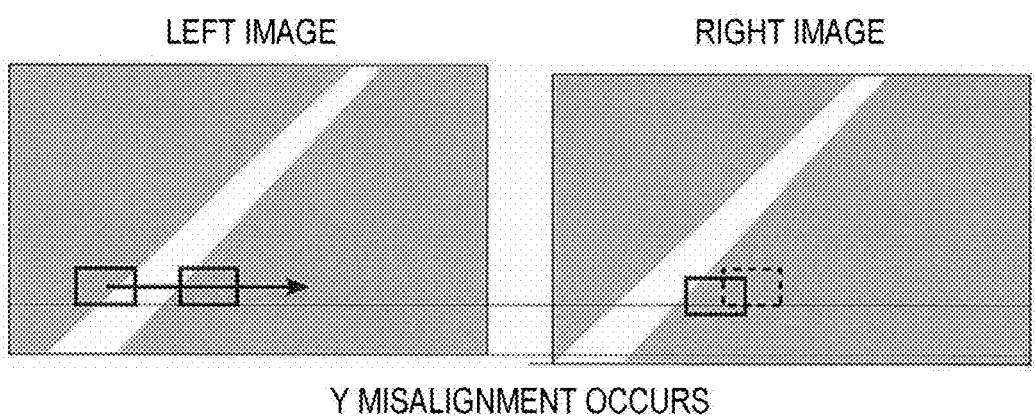
Y MISALIGNMENT OCCURS

PROCESSING DEVICE

TECHNICAL FIELD

The present invention relates to a processing device, for example, a processing device included in an in-vehicle environment recognition device.

BACKGROUND ART

A preventive safety technology for preventing an accident in advance by recognizing a surrounding environment of a vehicle using a camera or the like mounted on the vehicle starts to be widespread, and development of a surrounding environment recognition technology is also accelerated. One of the surrounding environments to be recognized is a step present on a road.

The step present on a road is a step such as a curb or a side groove present at a road edge located on a side of the road, a step such as a bump or a joint present in a road surface, an obstacle present on a road surface, or the like, and there are various types of steps. In particular, a step present at a road edge of a general road is extremely complicated because the presence or absence of a curb of a sidewalk or a wall, the presence or absence of a lane marking, and the like are greatly different for each road, an obstacle such as a utility pole, a rock, or grass protrudes into a traveling lane, or some objects fall. Accurate detection of the step present on a road is more difficult than accurate detection of a line marking between traveling lanes.

As an invention for detecting the step present on a road, for example, there is an image processing device described in PTL 1. The image processing device described in PTL 1 includes an input unit that acquires a stereo image, and a processor that calculates parallax distribution from the stereo image acquired by the input unit, calculates a plurality of equal parallax lines connecting points having equal parallaxes based on the parallax distribution, and detects a shape of a road surface based on the plurality of equal parallax lines.

CITATION LIST

Patent Literature

PTL 1: JP 2018-200190 A

SUMMARY OF INVENTION

Technical Problem

When calculating the parallax distribution from the stereo image, the image processing device described in PTL 1 calculates a parallax by searching for corresponding points of a first image and a second image forming the stereo image while shifting a small region on the image in a horizontal direction.

Line segments in the first image and the second image have similar feature amounts at a plurality of points on the line segments. In a case where a direction in which the line segments extend is the same as a direction in which the corresponding points of the first image and the second image are searched for, it is difficult to search for positions of the correct corresponding points, and erroneous parallax measurement is likely to occur. When erroneous parallax measurement occurs, a result of measuring a distance in a depth direction measured according to the parallax also includes a large error. As a result, there is a possibility that it is erroneously detected that a step is present at a location where the step is not actually present.

Since the image processing device described in PTL 1 does not take into consideration erroneous parallax measurement, there is room for improvement in terms of more accurately detecting a step present on a road.

The present invention has been made in view of the above, and an object of the present invention is to accurately detect a step present on a road by suppressing erroneous detection due to erroneous parallax measurement.

Solution to Problem

In order to solve the above problem, the present invention has a characteristic of including: a feature image generation unit that acquires features of a pair of images and generates a feature image; a step candidate extraction unit that extracts a step candidate of a road on which the vehicle travels from the feature image generated by the feature image generation unit; a line segment candidate extraction unit that extracts a line segment candidate from the images; an analysis unit that performs collation between the step candidate extracted by the step candidate extraction unit and the line segment candidate extracted by the line segment candidate extraction unit and analyzes validity of the step candidate based on a collation result and an inclination of the line segment candidate; and a three-dimensional object detection unit that detects a step present on the road based on an analysis result of the analysis unit.

Advantageous Effects of Invention

According to the present invention, it is possible to accurately detect a step present on a road by suppressing erroneous detection due to erroneous parallax measurement.

Problems, configurations, and effects other than those described above will become apparent by the following description of embodiments.

BRIEF DESCRIPTION OF DRAWINGS

FIG. 9 is a diagram for describing processing performed by a flat road surface analysis unit illustrated in FIG. 8.

FIG. 10 is a diagram illustrating processing of a road edge step extraction unit and a traveling road surface step extraction unit illustrated in FIG. 8.

FIG. 14 is a diagram for describing processing performed by a horizontal line checking unit illustrated in FIG. 12.

FIG. 15 is a diagram for describing processing performed by a diagonal line checking unit illustrated in FIG. 12.

FIG. 16 is a diagram for describing processing performed by the diagonal line checking unit illustrated in FIG. 12.

DESCRIPTION OF EMBODIMENTS

Hereinafter, embodiments of the present invention will be described with reference to the drawings. Note that components denoted by the same reference signs in the respective embodiments have similar functions in the respective embodiments unless otherwise specified, and thus a description thereof will be omitted. Note that, hereinafter, an example in which a stereo vision system is adopted as an example of a sensing system implemented by an in-vehicle environment recognition device will be described, but the present invention is not limited to the stereo vision system. A parallax is an example of a feature of an image.

[In-Vehicle Environment Recognition Device]

Figure 1:
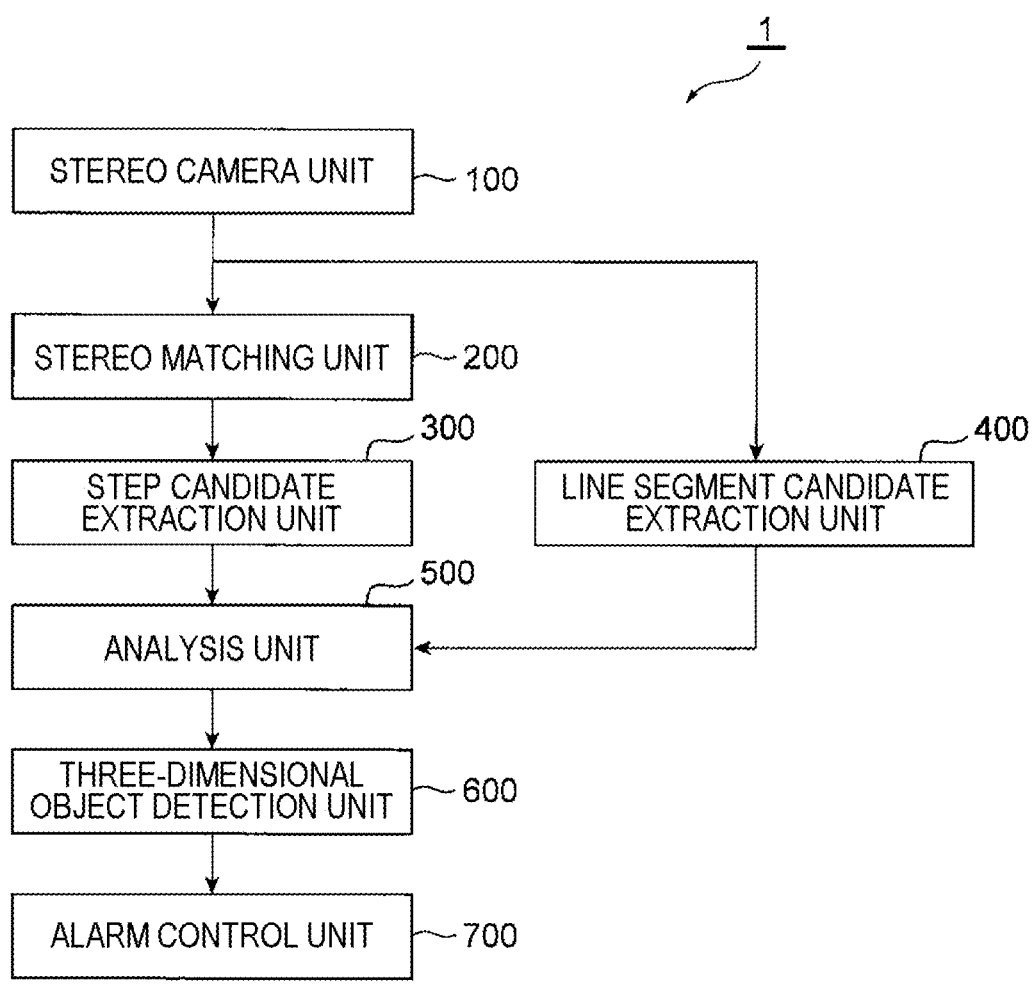
FIG. 1 is a diagram illustrating a configuration of an in-vehicle environment recognition device.

FIG. 1 is a diagram illustrating a configuration of an in-vehicle environment recognition device 1.

The in-vehicle environment recognition device 1 is a device that performs surrounding environment recognition processing. The surrounding environment recognition processing is processing of processing a surrounding image acquired by a pair of cameras mounted on a vehicle, recognizing a surrounding environment such as a road, a preceding vehicle, a pedestrian, or an obstacle, and outputting information necessary for vehicle traveling control, alarm notification, and the like. The in-vehicle environment recognition device 1 is implemented by cooperation between hardware such as a microcomputer and software including a program describing a content of the surrounding environment recognition processing.

As illustrated in FIG. 1, the in-vehicle environment recognition device 1 includes a stereo camera unit 100, a stereo matching unit 200, a step candidate extraction unit 300, a line segment candidate extraction unit 400, an analysis unit 500, a three-dimensional object detection unit 600, and an alarm control unit 700.

The stereo camera unit 100 is a sensing system including a pair of cameras installed on an inner side of a windshield of the vehicle and directed toward a front area in a traveling direction. In the stereo camera unit 100, a pair of cameras capture images of a surrounding of the vehicle in synchronization with each other to acquire a pair of images.

The stereo matching unit 200 performs stereo matching processing by using the pair of images acquired by the stereo camera unit 100, and measures a parallax of the same point of the same object reflected in each of the pair of images. The stereo matching unit 200 measures a distance and a position in a three-dimensional space based on the measured parallax by using the principle of triangulation. The stereo matching unit 200 illustrated in FIG. 1 performs stereo matching processing of searching for corresponding points of a pair of images in a direction (base line direction) connecting the pair of cameras to generate a parallax image. The parallax image is an image in which a distance in a depth direction of each pixel measured according to the parallax between the pixels of the pair of images is mapped to each pixel. The parallax image is an example of a feature image representing features of the pair of images acquired by the stereo camera unit 100. The stereo matching unit 200 is an example of a feature image generation unit that acquires the features of the pair of images and generates the feature image. The features of the pair of images may be, for example, a difference between the pair of images obtained by comparing the pair of images.

In the stereo matching processing, in a case where a direction in which the corresponding points of the pair of images are searched for and a direction in which line segments on the image extend substantially coincide with each other, the line segments on the image have similar feature amounts at a plurality of points, and thus, there is a possibility that equivalent similarity is continuous and it becomes difficult to search for a correct corresponding point. In this case, erroneous parallax measurement occurs, and the parallax measurement result may include a large error. The erroneous parallax measurement is a problem unavoidable as long as the principle of triangulation is used. When the erroneous parallax measurement occurs, the distance in the depth direction measured according to the parallax is also erroneously measured, and the distance measurement result may also include a large error.

In the present embodiment, a direction on the image along the direction in which the corresponding points are searched for in the stereo matching processing is also referred to as a "first direction". A direction perpendicular to the first direction on the image is also referred to as a "second direction". A direction intersecting the first direction and the second direction on the image is also referred to as a "third direction".

In a case where the pair of cameras included in the stereo camera unit 100 is installed at intervals in a left-right direction that is a vehicle width direction of the vehicle, the direction in which the corresponding points are searched for in the stereo matching processing is the left-right direction and corresponds to a horizontal direction on the image. In this case, the first direction is the horizontal direction, the second direction is a vertical direction, and the third direction is a diagonal direction intersecting the horizontal direction and the vertical direction. In this case, in a case where a line on the image extends in the horizontal direction (first direction) or the diagonal direction (third direction), there is a possibility that erroneous parallax measurement occurs.

Similarly, in a case where the pair of cameras included in the stereo camera unit 100 are installed at intervals in the top-bottom direction that is a height direction of the vehicle, the direction in which the corresponding points are searched for in the stereo matching processing is a top-bottom direction and corresponds to the vertical direction on the image. In this case, the first direction is the vertical direction, the second direction is the horizontal direction, and the third direction is the diagonal direction intersecting the vertical direction and the horizontal direction. In this case, in a case where a line on the image extends in the vertical direction (first direction) or the diagonal direction (third direction), there is a possibility that erroneous parallax measurement occurs.

The step candidate extraction unit 300 extracts a road step candidate from the parallax image generated by the stereo matching unit 200. Specifically, the step candidate extraction unit 300 analyzes a flat road surface portion of a traveling road on which the vehicle travels by using the parallax image generated by the stereo matching unit 200. The flat road surface portion is a road surface of the traveling road (hereinafter, also referred to as a "traveling road surface") and is a portion that can be regarded as a substantially flat surface. The step candidate extraction unit 300 extracts a three-dimensional point group having a height difference from the flat road surface portion as the road step candidate.

A step present on the road is a three-dimensional object having a height difference from the flat road surface portion. The step present on the road includes a step having a protruding shape higher than the flat road surface portion and a step having a recess shape lower than the flat road surface portion. The step present on the road includes a step present at a road edge located on a side of the traveling road, a step such as a bump, a joint, or a hole present on the traveling road surface, an obstacle present on the traveling road surface, and the like. The road edge includes a shoulder, a roadside zone, or a sidewalk adjacent to the side of the traveling road surface. Examples of the protruding step present at the road edge include a step having a small height difference present between the traveling road surface and the shoulder, and a step such as a curb present between the sidewalk and the shoulder. The recessed step present at the road edge is a side groove or the like lower than the flat road surface portion.

The line segment candidate extraction unit 400 uses an edge image of the image acquired by the stereo camera unit 100 to search for straight line candidates included in the image based on the continuity and linearity of the edge. The line segment candidate extraction unit 400 extracts a line segment candidate having a start point and an end point from among the searched straight line candidates, and classifies the extracted line segment candidate according to an extending direction thereof. For example, the line segment candidate extraction unit 400 classifies the extracted line segment candidate as a line segment candidate extending in the first direction, a line segment candidate extending in the second direction, or a line segment candidate extending in the third direction.

The analysis unit 500 analyzes whether or not an erroneous step candidate is extracted due to an influence of the erroneous parallax measurement. Specifically, the analysis unit 500 performs collation between the step candidate extracted by the step candidate extraction unit 300 and the line segment candidate extracted by the line segment candidate extraction unit 400. The collation processing may be, for example, processing of checking whether or not the step candidate overlaps with the line segment candidate. Then, the analysis unit 500 analyzes validity of the step candidate extracted by the step candidate extraction unit 300 based on the collation result and an inclination of the line segment candidate.

The high validity of the step candidate means that there is a high possibility that the step candidate indicates a step actually present on the road. The low validity of the step candidate means that it is difficult to determine whether or not the step candidate indicates a step actually present on the road, and a possibility of extraction due to erroneous parallax measurement cannot be excluded.

In a case where the step candidate having a small height difference and the line segment candidate extending in the first direction or the third direction overlap with each other, there is a possibility that the step candidate is not a step actually present on the road. For example, in a case where the pair of cameras is installed in the left-right direction, there is a possibility that the step candidate having a small height difference overlapping the line segment candidate extending in the horizontal direction or the diagonal direction is a road surface marking extending in the horizontal direction or the diagonal direction, such as a line marking or a channelizing zone (zebra zone) drawn on the road surface. There is a possibility that the step candidate overlapping with the line segment candidate extending in the first direction or the third direction is extracted due to occurrence of erroneous parallax measurement.

In a case where the analysis unit 500 does not determine that the step candidate is a step present on the road based on the collation result, that is, in a case where the validity of the step candidate is low, the analysis unit 500 analyzes arrangement of a three-dimensional point group constituting the step candidate, and analyzes whether or not there is a possibility that the step candidate is extracted due to erroneous parallax measurement. In a case where there is a possibility that the step candidate is extracted due to erroneous Parallax measurement, the analysis unit 500 analyzes a cause of the erroneous parallax measurement.

For example, the analysis unit 500 analyzes whether the cause of the erroneous parallax measurement is the fact that the heights of the images do not coincide with each other in parallelization processing for the pair of images (hereinafter, also referred to as "Y misalignment"), a bias of a texture in a matching window, a random noise, or the like. In a case where the step candidate is highly likely to have been extracted due to erroneous parallax measurement, the analysis unit 500 re-measures the parallax by performing the stereo matching processing again, and corrects the distance according to the parallax or eliminate the extracted step candidate as noise.

The three-dimensional object detection unit 600 corrects a height and an inclination of the flat road surface portion by using the parallax re-measured by the analysis unit 500, and performs processing of detecting the step present on the road based on the corrected flat road surface portion. That is, the three-dimensional object detection unit 600 identifies a step present on the road and a road surface marking based on the corrected flat road surface portion, and detects a step present at the road edge, a step such as a bump present on the traveling road surface, an obstacle present on the traveling road surface, and the like. Note that the three-dimensional object detection unit 600 may perform processing of detecting a step present on the road based on the flat road surface portion before correction.

The alarm control unit 700 outputs information necessary for vehicle traveling control, alarm notification, and the like to a control device of the vehicle based on the detection result of the three-dimensional object detection unit 600.

In the present embodiment, the pair of cameras included in the stereo camera unit 100 is a pair of cameras installed at intervals in the left-right direction, and the direction in which the corresponding points are searched for in the stereo matching processing is described as the horizontal direction on the image. Among the pair of left and right cameras, an image acquired by the right camera is also referred to as a "right image", and an image acquired by the left camera is also referred to as a "left image". However, the present embodiment can also be applied to a case where the pair of cameras included in the stereo camera unit 100 is a pair of cameras installed at intervals in the top-bottom direction.

[Distance Measurement Method]

Figure 2:
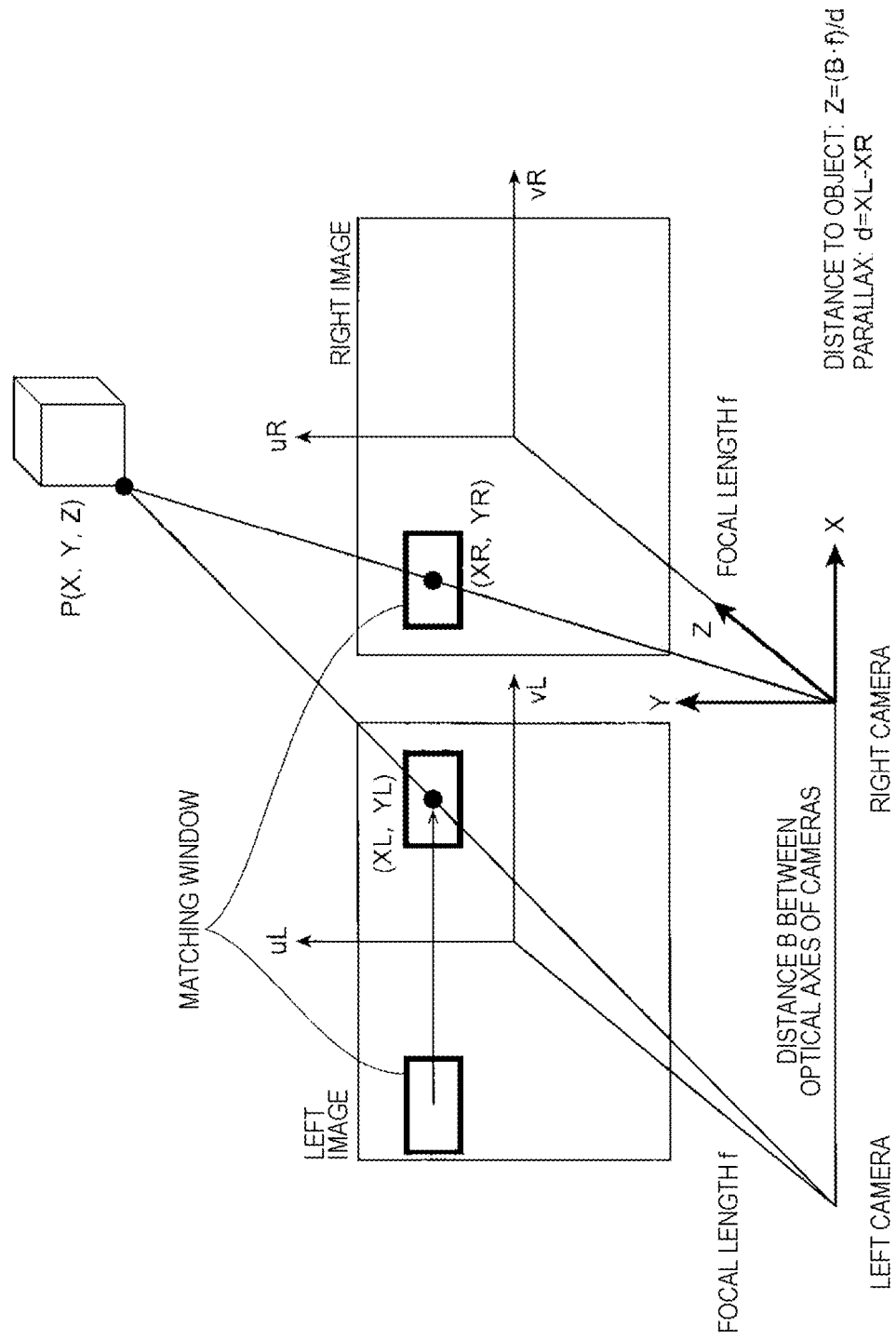
FIG. 2 is a diagram for describing a distance measurement method using a principle of triangulation.

FIG. 2 is a diagram for describing a distance measurement method using the principle of triangulation.

In FIG. 2, it is assumed that a lower left vertex of a rectangular parallelepiped appears at coordinates (XR,YR) in the right image of the pair of images, and appears at coordinates (XL,YL) in the left image of the pair of images. A parallax at the lower left vertex of the rectangular parallelepiped is denoted by d, a coordinate in the depth direction is denoted by Z, a distance (base line length) between optical axes of the pair of cameras that acquires a pair of images is denoted by B, and a focal length of each of the pair of cameras is denoted by f.

In a pair of cameras having the same specification and installed completely in parallel, in a case where distortion, optical axis deviation, or the like of the camera is corrected, the same portion of the same object appearing in each of the pair of images appears at the same height in the left image and the right image. In this case, the parallax d and the coordinate Z in the depth direction are calculated by the following equations.

$$d = XL - XR \quad Z = (B \cdot f)/d$$

The above coordinate Z represents the distance from the pair of cameras to the object in front of the cameras. The smaller the difference (XL−XR) between the corresponding points of the pair of images in the horizontal direction, that is, the smaller the parallax d, the longer the distance to the object, and the larger the parallax d, the shorter the distance to the object. Since the parallax d is a denominator in the equation for calculating the coordinate Z, a resolution of the coordinate Z in the depth direction increases as the parallax d increases. In other words, the shorter the distance from the pair of cameras to the object, the more precisely the distance in the depth direction can be measured.

[Stereo Camera Unit]

Figure 3:
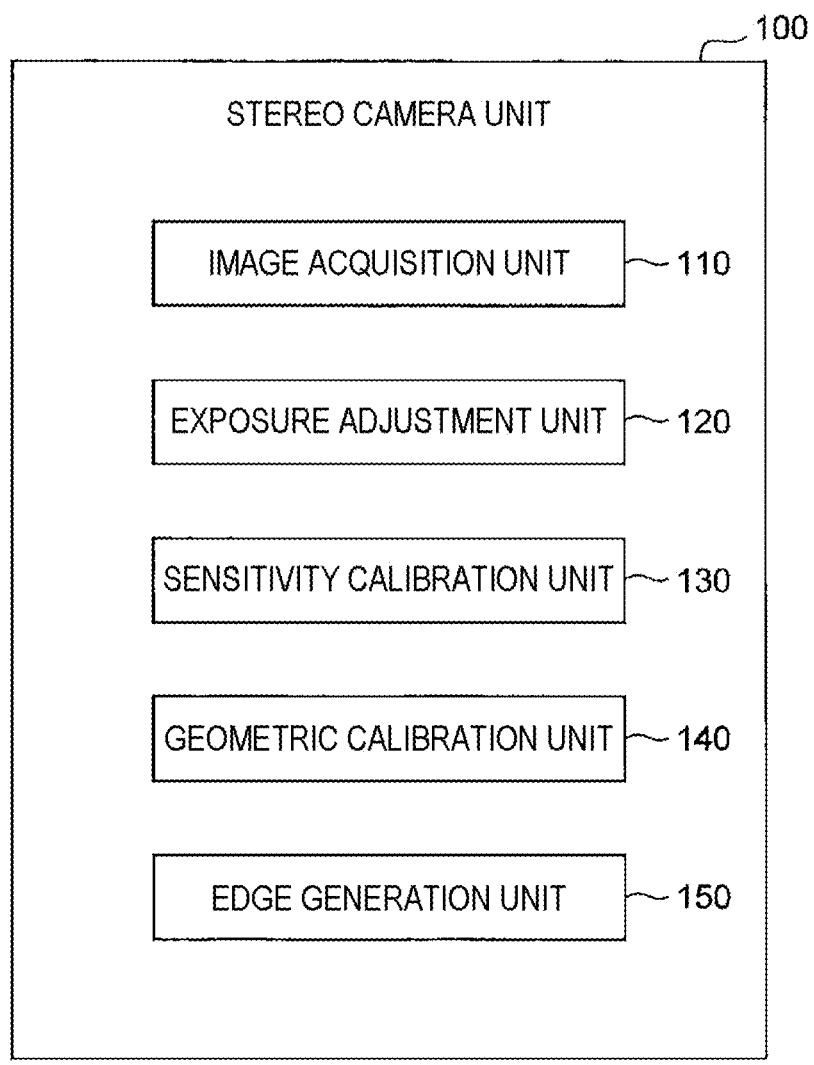
FIG. 3 is a diagram illustrating a configuration of a stereo camera unit.

FIG. 3 is a diagram illustrating a configuration of the stereo camera unit 100.

As illustrated in FIG. 3, the stereo camera unit 100 includes an image acquisition unit 110, an exposure adjustment unit 120, a sensitivity calibration unit 130, a geometric calibration unit 140, and an edge generation unit 150.

The image acquisition unit 110 is a stereo camera including a pair of cameras installed at intervals in the left-right direction that is the vehicle width direction of the vehicle. The pair of cameras included in the image acquisition unit 110 is disposed in such a manner that optical axes thereof are parallel to each other and face forward. The pair of cameras is calibrated to be in an installation state in which images acquired by the respective cameras are parallelized. The image acquisition unit 110 captures images of the surrounding of the vehicle in synchronization to acquire a pair of images. In the pair of images acquired by the image acquisition unit 110, the same object appears at the same height.

The exposure adjustment unit 120 adjusts an exposure condition so that the pair of images is acquired under the same exposure condition in the image acquisition unit 110. For example, the exposure adjustment unit 120 analyzes a luminance of the traveling road surface of the right image of the pair of acquired images, determines the exposure condition of the next frame, and reflects the determined exposure condition on each camera of the image acquisition unit 110 to adjust the exposure condition.

The sensitivity calibration unit 130 calibrates sensitivities of the pair of cameras included in the image acquisition unit 110. In the pair of images acquired by the image acquisition unit 110, even under the same exposure condition of the image acquisition unit 110, the same portion of the same object does not have the same luminance due to characteristics such as a difference in luminance caused by individual differences of the cameras and a characteristic that the luminance decreases as the distance from the optical axis of the lens increases in some cases. The sensitivity calibration unit 130 corrects these characteristics, and calibrates the sensitivities of the pair of cameras so that the same portion of the same object appearing in each of the pair of images has the same luminance.

The geometric calibration unit 140 corrects distortion, optical axis deviation, and the like of the pair of cameras included in the image acquisition unit 110, and calibrates geometric conditions of the pair of images so that the pair of images is parallelized. In the stereo camera unit 100, calibration is performed by the sensitivity calibration unit 130 and the geometric calibration unit 140, so that it can be easy to search for the same point of the same object appearing in each of the pair of images.

The edge generation unit 150 generates the edge image by performing edge extraction processing on a reference image, for example, the right image, of the pair of images acquired by the image acquisition unit 110. The edge image includes a horizontal edge having a luminance change in the horizontal direction and a vertical edge having a luminance change in the vertical direction. Note that the reference image may be the left image.

[Stereo Matching Unit]

Figure 4:
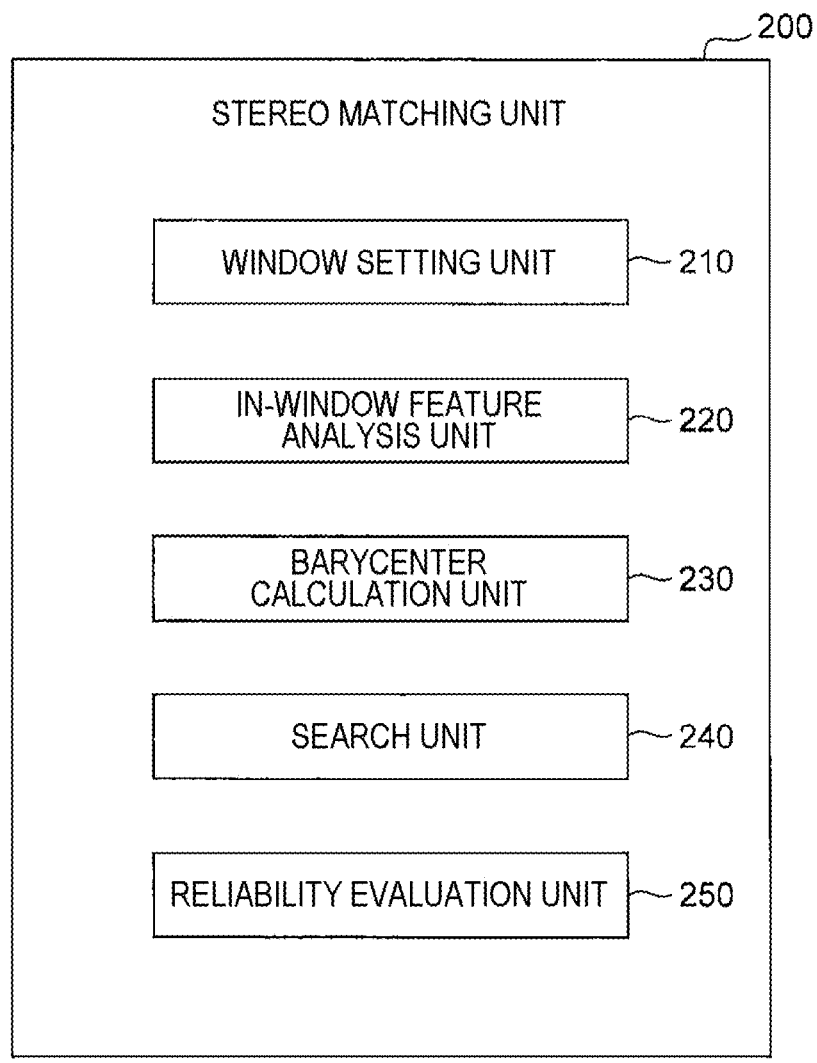
FIG. 4 is a diagram illustrating a configuration of a stereo matching unit.
Figure 5:
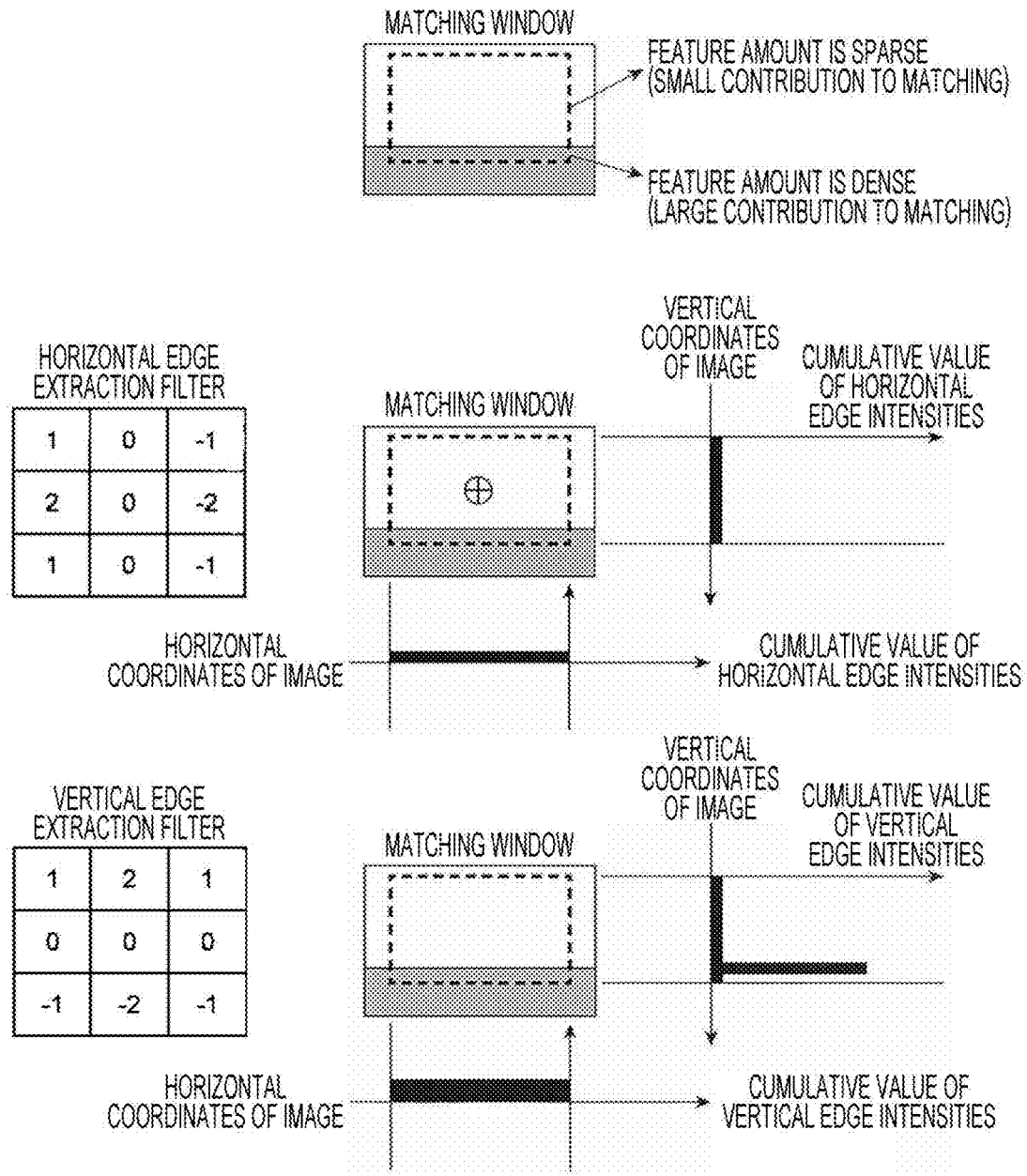
FIG. 5 is a diagram for describing an analysis result in a case where a feature amount in a matching window is biased in a vertical direction.
Figure 6:
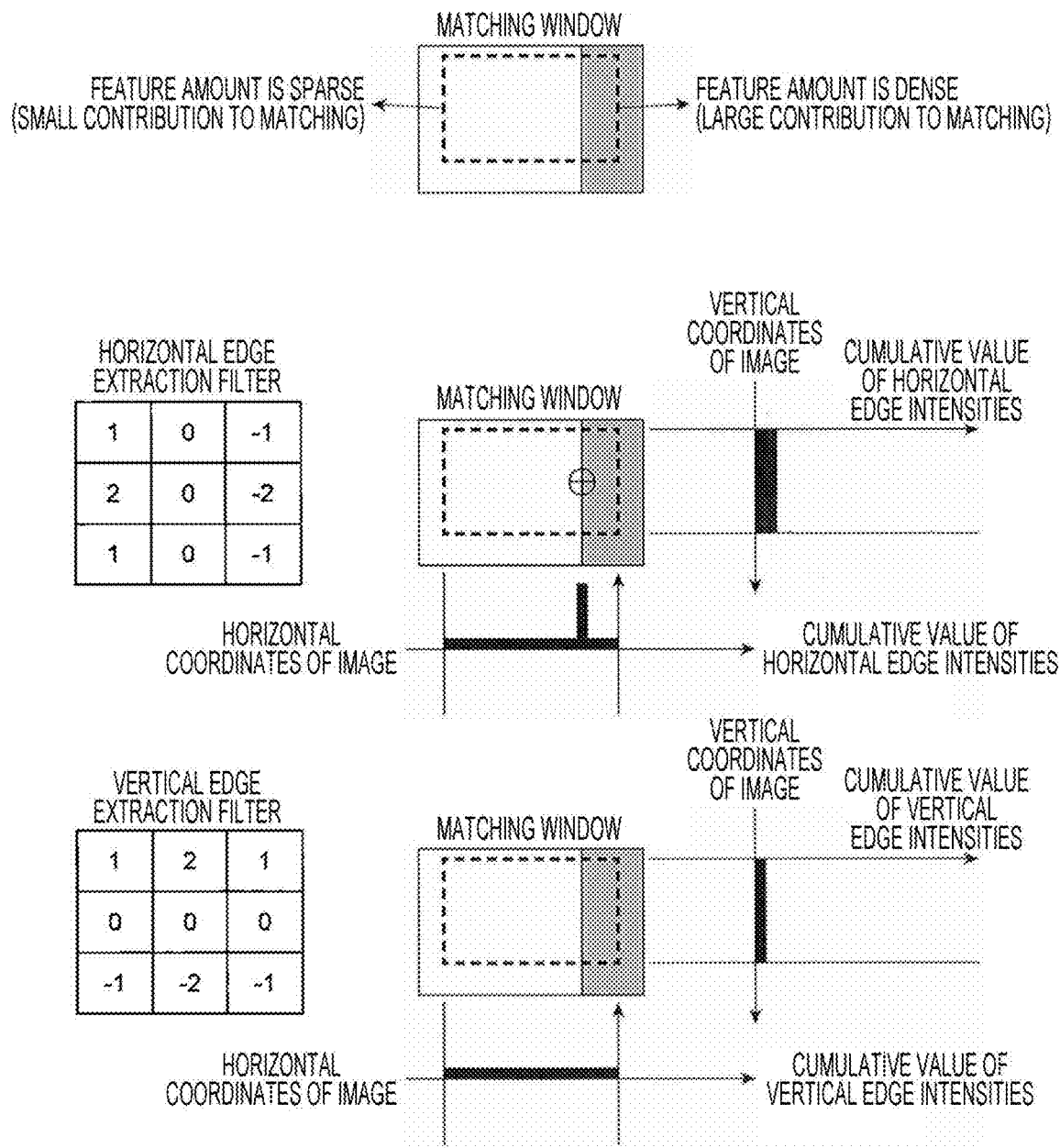
FIG. 6 is a diagram for describing an analysis result in a case where the feature amount in the matching window is biased in a horizontal direction.
Figure 7:
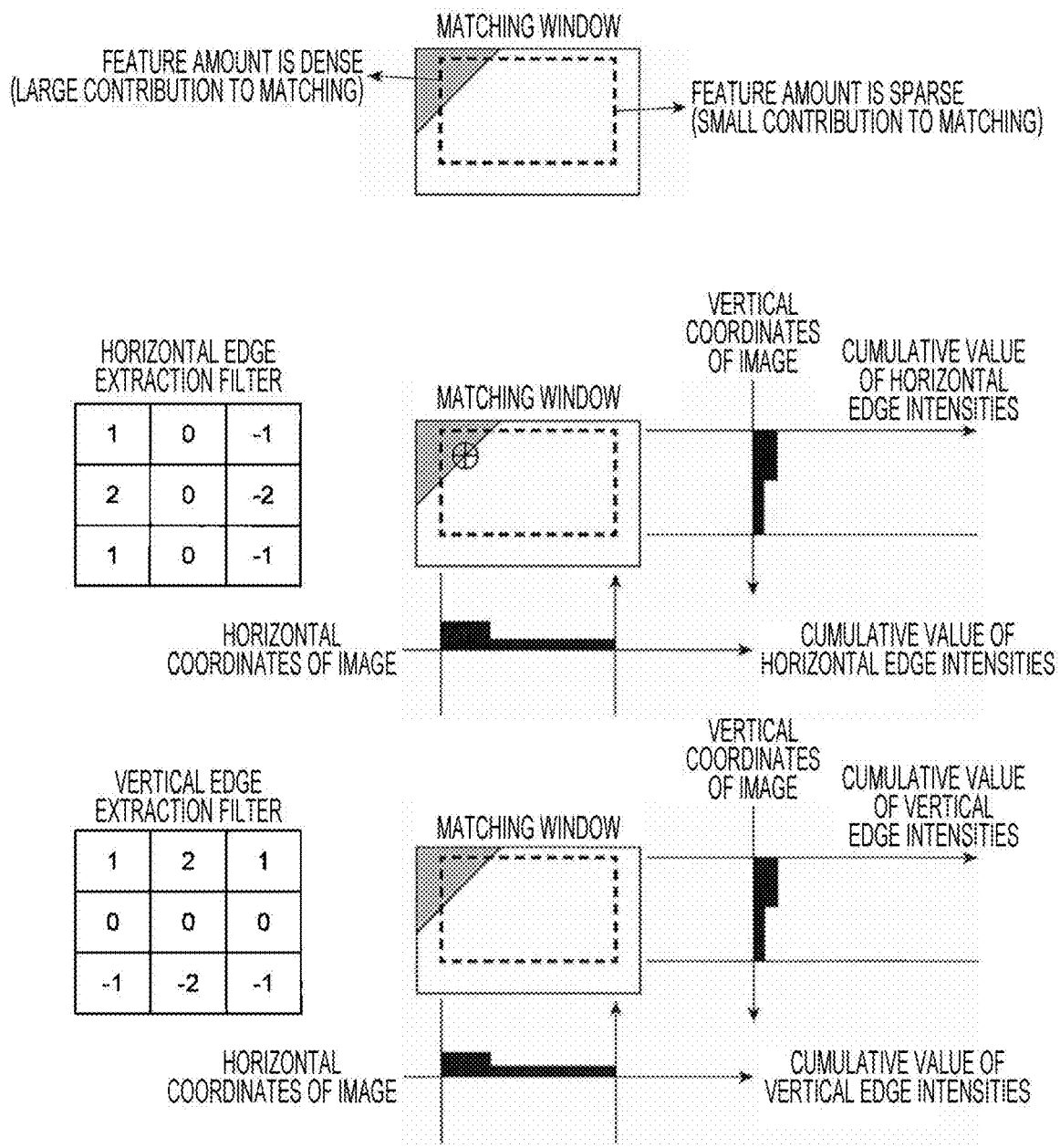
FIG. 7 is a diagram for describing an analysis result in a case where the feature amount in the matching window is biased in a diagonal direction.

FIG. 4 is a diagram illustrating a configuration of the stereo matching unit 200. FIG. 5 is a diagram for describing an analysis result in a case where the feature amount in the matching window is biased in the vertical direction (in a case of a vertically biased texture). FIG. 6 is a diagram for describing an analysis result in a case where the feature amount in the matching window is biased in the horizontal direction (in a case of a horizontally biased texture). FIG. 7 is a diagram for describing an analysis result in a case where the feature amount in the matching window is biased in the diagonal direction (in a case of a diagonal texture).

As illustrated in FIG. 4, the stereo matching unit 200 includes a window setting unit 210, an in-window feature analysis unit 220, a barycenter calculation unit 230, a search unit 240, and a reliability evaluation unit 250.

Here, stereo matching processing performed by the stereo matching unit 200 will be described with reference to FIG. 2. In FIG. 2, it is assumed that a lower left corner of the rectangular parallelepiped appears at the coordinates (XR, YR) in the right image of the pair of images, and appears at the coordinates (XL,YL) in the left image of the pair of images. The right image is the reference image.

At this time, the window setting unit 210 focuses on a pixel at the coordinates (XR,YR) of the right image and sets a small rectangular region around the coordinates (XR,YR) as the matching window. Since the geometric conditions of the right image and the left image are calibrated by the geometric calibration unit 140, the window setting unit 210 sets, in the left image, the matching window having the same size and the same height as those of the matching window set in the right image. The search unit 240 calculates a similarity between a feature amount in the matching window of the right image and a feature amount in the matching window of the left image. After the calculation of the similarity by the search unit 240, the window setting unit 210 sets the matching window in the left image by moving the matching window in the left image in the horizontal direction pixel by pixel. The search unit 240 calculates the similarity between the matching windows of the left image and the right image. While repeating such processing, the search unit 240 searches for the matching window of the left image having the highest similarity. The search unit 240 sets a position of the matching window of the left image having the highest similarity as a position of a pixel of the left image corresponding to the focused pixel of the right image.

The search unit 240 measures the parallax between the right image and the left image based on coordinates of the focused pixel of the right image and coordinates of the pixel of the left image corresponding to the focused pixel.

Once the search unit 240 searches for the pixel of the left image corresponding to the focused pixel of the right image and measures the parallax, the window setting unit 210 moves the focused pixel of the right image in the horizontal direction and sets the matching window. The search unit 240 searches for a pixel of the left image corresponding to the moved focused pixel and measures the parallax. While repeating such processing, the search unit 240 can search for the corresponding points of the right image and the left image and measure the parallax to generate the parallax image.

The in-window feature analysis unit 220 analyzes the bias of the feature amount in the matching window set in the right image by the window setting unit 210. The in-window feature analysis unit 220 analyzes the bias of the feature amount in the matching window before the search unit 240 performs searching.

The in-window feature analysis unit 220 uses the edge image generated by the edge generation unit 150 in order to analyze the bias of the feature amount in the matching window. Specifically, the in-window feature analysis unit 220 sets the matching window for the same region as the matching window set in the right image by the window setting unit 210 in the edge image generated by the edge generation unit 150. Then, the in-window feature analysis unit 220 analyzes an edge in the matching window set in the edge image as the feature amount in the matching window.

As illustrated in FIGS. 5 to 7, the in-window feature analysis unit 220 performs horizontal edge extraction processing and vertical edge extraction processing on the image in the matching window. The horizontal edge extraction processing is processing of performing edge extraction on the image in the matching window by using a horizontal edge extraction filter. The vertical edge extraction processing is processing of performing edge extraction on the image in the matching window by using a vertical edge extraction filter. The in-window feature analysis unit 220 projects the processing result of each of the horizontal edge extraction processing and the vertical edge extraction processing in each of the horizontal direction and the vertical direction.

Specifically, the in-window feature analysis unit 220 shows a cumulative value obtained by accumulating horizontal edge intensities in the horizontal direction for each vertical coordinate as a result of projecting the horizontal edge extraction processing result in the horizontal direction, and generates a histogram indicating vertical distribution of the cumulative value of the horizontal edge intensities. The in-window feature analysis unit 220 shows a cumulative value obtained by accumulating the horizontal edge intensities in the vertical direction for each horizontal coordinate as a result of projecting the horizontal edge extraction processing result in the vertical direction, and generates a histogram indicating horizontal distribution of the cumulative value of the horizontal edge intensities. That is, the in-window feature analysis unit 220 generates a histogram, of cumulative values obtained by accumulating intensities of an edge having a luminance change in the horizontal direction (horizontal edge intensities) in the matching window in the horizontal direction. The in-window feature analysis unit 220 generates a histogram of cumulative values obtained by accumulating intensities of an edge having a luminance change in the horizontal direction (horizontal edge intensities) in the matching window in the vertical direction.

Similarly, the in-window feature analysis unit 220 shows a cumulative value obtained by accumulating vertical edge intensities in the horizontal direction for each vertical coordinate as a result of projecting the vertical edge extraction processing result in the horizontal direction, and generates a histogram indicating vertical distribution of the cumulative value of the vertical edge intensities. The in-window feature analysis unit 220 shows a cumulative value obtained by accumulating vertical edge intensities in the vertical direction for each vertical coordinate as a result of projecting the vertical edge extraction processing result in the vertical direction, and generates a histogram indicating horizontal distribution of the cumulative value of the vertical edge intensities.

The in-window feature analysis unit 220 can grasp the presence or absence of the bias of the feature amount in the window and a direction of the bias based on the generated histogram.

An analysis result in a case where the feature amount in the matching window is biased in the vertical direction will be described with reference to FIG. 5. In FIG. 5, a case where the feature amount in the matching window is large in a lower portion in the matching window as illustrated in the upper part of FIG. 5 will be described. The horizontal edge extraction filter is illustrated on the left side of the middle part of FIG. 5. A histogram indicating the result of projecting the horizontal edge extraction processing result in the horizontal direction is illustrated on the right side of the middle part of FIG. 5. A histogram indicating the result of projecting the horizontal edge extraction processing result in the vertical direction is illustrated on the lower side of the middle part of FIG. 5. The vertical edge extraction filter is illustrated on the left side of the lower part of FIG. 5. A histogram indicating the result of projecting the vertical edge extraction processing result in the horizontal direction is illustrated on the right side of the lower part of FIG. 5. A histogram indicating the result of projecting the vertical edge extraction processing result in the vertical direction is illustrated on the lower side of the lower part of FIG. 5.

The image in the matching window illustrated in the upper part of FIG. 5 has no luminance change in the horizontal direction. That is, the image in the matching window illustrated in the upper part of FIG. 5 has no horizontal edge with a high intensity. The image in the matching window illustrated in the upper part of FIG. 5 has a luminance change in the vertical direction, and is continuous in the horizontal direction with the same luminance change in the vertical direction. That is, the image in the matching window illustrated in the upper part of FIG. 5 has a vertical edge with a high intensity.

The result of projecting the horizontal edge extraction processing result in the horizontal direction indicates that the cumulative value of the horizontal edge intensities is smaller than a predetermined reference value and is constant over the vertical direction, as illustrated on the right side of the middle part of FIG. 5. The result of projecting the horizontal edge extraction processing result in the vertical direction indicates that the cumulative value of the horizontal edge intensities is smaller than the reference value and is constant over the horizontal direction, as illustrated on the lower side of the middle part of FIG. 5.

The result of projecting the vertical edge extraction processing result in the horizontal direction indicates that the cumulative value of the vertical edge intensities is smaller than the reference value and is constant from an upper portion to the lower portion in the window, but the cumulative value of the vertical edge intensities is extremely larger than the reference value in the lower portion in the window, as illustrated on the right side of the lower part of FIG. 5. The result of projecting the vertical edge extraction processing result in the vertical direction indicates that the cumulative value of the vertical edge intensities is larger than the cumulative value obtained by accumulating the horizontal edge intensities in the vertical direction (see the histogram on the lower side of the middle part of FIG. 5) and is constant over the horizontal direction, as illustrated on the lower side of the lower part of FIG. 5.

The in-window feature analysis unit 220 can grasp that the feature amount in the window is biased in the vertical direction based on the histograms illustrated in FIG. 5.

An analysis result in a case where the feature amount in the matching window is biased in the horizontal direction will be described with reference to FIG. 6. In FIG. 6, a case where the feature amount in the matching window is large in a right portion in the matching window as illustrated in the upper part of FIG. 6 will be described. The horizontal edge extraction filter is illustrated on the left side of the middle part of FIG. 6. A histogram indicating the result of projecting the horizontal edge extraction processing result in the horizontal direction is illustrated on the right side of the middle part of FIG. 6. A histogram indicating the result of projecting the horizontal edge extraction processing result in the vertical direction is illustrated on the lower side of the middle part of FIG. 6. The vertical edge extraction filter is illustrated on the left side of the lower part of FIG. 6. A histogram indicating the result of projecting the vertical edge extraction processing result in the horizontal direction is illustrated on the right side of the lower part of FIG. 6. A histogram indicating the result of projecting the vertical edge extraction processing result in the vertical direction is illustrated on the lower side of the lower part of FIG. 6.

The image in the matching window illustrated in the upper part of FIG. 6 has no luminance change in the vertical direction. That is, the image in the matching window illustrated in the upper part of FIG. 6 has no vertical edge with a high intensity. The image in the matching window illustrated in the upper part of FIG. 6 has a luminance change in the horizontal direction, and is continuous in the vertical direction with the same luminance change in the horizontal direction. That is, the image in the matching window illustrated in the upper part of FIG. 6 has a horizontal edge with a high intensity.

Therefore, the result of projecting the horizontal edge extraction processing result in the horizontal direction indicates that the cumulative value of the horizontal edge intensities is larger than the cumulative value obtained by accumulating the vertical edge intensities in the horizontal direction (see the histogram on the right side of the lower part of FIG. 6) and is constant over the vertical direction, as illustrated on the right side of the middle part of FIG. 6. The result of projecting the horizontal edge extraction processing result in the vertical direction indicates that the cumulative value of the horizontal edge intensities is smaller than the reference value and is constant from a left portion to the right portion in the window, but the cumulative value of the horizontal edge intensities is extremely larger than the reference value in the right portion in the window, as illustrated on the lower side of the middle part of FIG. 6.

The result of projecting the vertical edge extraction processing result in the horizontal direction indicates that the cumulative value of the vertical edge intensities is smaller than the reference value and is constant over the vertical direction, as illustrated on the right side of the lower part of FIG. 6. The result of projecting the vertical edge extraction processing result in the vertical direction indicates that the cumulative value of the vertical edge intensities is smaller than the reference value and is constant over the horizontal direction, as illustrated on the lower side of the lower part of FIG. 6.

The in-window feature analysis unit 220 can grasp that the feature amount in the window is biased in the horizontal direction based on the histograms illustrated in FIG. 6.

An analysis result in a case where the feature amount in the matching window is biased in the diagonal direction will be described with reference to FIG. 7. In FIG. 7, a case where the feature amount in the matching window is large in an upper left portion in the matching window as illustrated in the upper part of FIG. 7 will be described. The horizontal edge extraction filter is illustrated on the left side of the middle part of FIG. 7. A histogram indicating the result of projecting the horizontal edge extraction processing result in the horizontal direction is illustrated on the right side of the middle part of FIG. 7. A histogram indicating the result of projecting the horizontal edge extraction processing result in the vertical direction is illustrated on the lower side of the middle part of FIG. 7. The vertical edge extraction filter is illustrated on the left side of the lower part of FIG. 7. A histogram indicating the result of projecting the vertical edge extraction processing result in the horizontal direction is illustrated on the right side of the lower part of FIG. 7. A histogram indicating the result of projecting the vertical edge extraction processing result in the vertical direction is illustrated on the lower side of the lower part of FIG. 7.

In the image in the matching window illustrated in the upper part of FIG. 7, there is a luminance change in each of the horizontal direction and the vertical direction in the upper left portion in the matching window, but there is no luminance change in each of the horizontal direction and the vertical direction except for the upper left portion in the matching window. That is, in the image in the matching window illustrated in the upper part of FIG. 7, a horizontal edge with a high intensity and a vertical edge with a high intensity are present only in the upper left portion in the matching window, and are not present except in the upper left portion in the matching window.

Therefore, the result of projecting the horizontal edge extraction processing result in the horizontal direction indicates that the cumulative value of the horizontal edge intensities is larger in the upper portion in the window than in a portion other than the upper portion in the window, as illustrated on the right side of the middle part of FIG. 7. The result of projecting the horizontal edge extraction processing result in the vertical direction indicates that the cumulative value of the horizontal edge intensities is larger in the left portion in the window than in a portion other than the left portion in the window, as illustrated on the lower side of the middle part of FIG. 7.

The result of projecting the vertical edge extraction processing result in the horizontal direction indicates that the cumulative value of the vertical edge intensities is larger than the reference value in the upper portion in the window and is larger in the upper portion in the window than in a portion other than the upper portion in the window, as illustrated on the right side of the lower part of FIG. 7. The result of projecting the vertical edge extraction processing result in the vertical direction indicates that the cumulative value of the vertical edge intensities is larger than the reference value in the left portion in the window and is larger in the left portion in the window than in a portion other than the left portion in the window, as illustrated on the lower side of the lower part of FIG. 7.

The in-window feature analysis unit 220 can grasp that the feature amount in the window is biased in the diagonal direction based on the histograms illustrated in FIG. 7.

Note that, in a case where there is no luminance change in the image in the matching window, in the histograms illustrated in FIGS. 5 to 7, the cumulative value obtained by accumulating the horizontal edge intensities in the horizontal direction, the cumulative value obtained by accumulating the horizontal edge intensities in the vertical direction, the cumulative value obtained by accumulating the vertical edge intensities in the horizontal direction, and the cumulative value obtained by accumulating the vertical edge intensities in the vertical direction are all smaller than the reference value and constant. The in-window feature analysis unit 220 can grasp that the feature amount is not biased in the matching window based on these histograms.

The barycenter calculation unit 230 calculates a barycenter position of the feature amount in the matching window set in the right image by the window setting unit 210. A default barycenter position is a center position of the matching window. Since the direction in which the corresponding points are searched for in the stereo matching processing is the horizontal direction, the barycenter calculation unit 230 calculates the barycenter position of the feature amount in the matching window based on the result of the horizontal edge extraction processing of extracting the luminance change in the horizontal direction. Specifically, the barycenter calculation unit 230 calculates the barycenter position of the feature amount in the matching window based on the histogram indicating the vertical distribution of the cumulative value obtained by accumulating the horizontal edge intensities in the horizontal direction (the histogram on the right side of the middle part of each of FIGS. 5 to 7) and the histogram indicating the horizontal distribution of the cumulative value obtained by accumulating the horizontal edge intensities in the vertical direction (the histogram, on the lower side of the middle part of each of FIGS. 5 to 7).

Specifically, the barycenter calculation unit 230 smooths the histogram indicating the vertical distribution of the cumulative value obtained by accumulating the horizontal edge intensities in the horizontal direction and the histogram indicating the horizontal distribution of the cumulative value obtained by accumulating the horizontal edge intensities in the vertical direction. Then, in a case where the cumulative value distribution has a cumulative value equal to or larger than a predetermined reference value and has a peak in each smoothed histogram, the barycenter calculation unit 230 calculates a vertical coordinate or horizontal coordinate of a position having the peak. Then, the barycenter calculation unit 230 determines the calculated vertical coordinate or horizontal coordinate as a vertical coordinate or horizontal coordinate of the barycenter position of the feature amount in the matching window.

On the other hand, in a case where the cumulative value distribution does not have a cumulative value equal to or larger than the reference value or does not have a peak in each histogram, the barycenter calculation unit 230 determines the vertical coordinate or horizontal coordinate of the center position in the matching window, which is the default barycenter position, as the vertical coordinate or horizontal coordinate of the barycenter position of the feature amount in the matching window.

For example, in a case where the feature amount in the matching window is large in the lower portion in the matching window as illustrated in the upper part of FIG. 5, the vertical distribution of the cumulative value obtained by accumulating the horizontal edge intensities in the horizontal direction is constant over the vertical direction and has no peak as illustrated on the right side of the middle part of FIG. 5. In this case, the barycenter calculation unit 230 determines the vertical coordinate of the center position of the matching window as the vertical coordinate of the barycenter position of the feature amount in the matching window. As illustrated on the lower side of the middle part of FIG. 5, the horizontal distribution of the cumulative value obtained by accumulating the horizontal edge intensities in the vertical direction is constant over the horizontal direction and has no peak. In this case, the barycenter calculation unit 230 determines the horizontal coordinate of the center position of the matching window as the horizontal coordinate of the barycenter position of the feature amount in the matching window. As a result, in a case where the feature amount is large in the lower portion in the matching window, the barycenter position of the feature amount in the matching window is a position indicated by a mark in which a cross is surrounded by a circle in the image in the middle part of FIG. 5.

In a case where the feature amount in the matching window is large in the right portion in the matching window as illustrated in the upper part of FIG. 6, the vertical distribution of the cumulative value obtained by accumulating the horizontal edge intensities in the horizontal direction is constant over the vertical direction and has no peak as illustrated on the right side of the middle part of FIG. 6. In this case, the barycenter calculation unit 230 determines the vertical coordinate of the center position of the matching window as the vertical coordinate of the barycenter position of the feature amount in the matching window. As illustrated on the lower side of the middle part of FIG. 6, the horizontal distribution of the cumulative value obtained by accumulating the horizontal edge intensities in the vertical direction has a cumulative value equal to or larger than the reference value and has a peak in the right portion in the matching window. In this case, the barycenter calculation unit 230 determines a horizontal coordinate of a position of the right portion in the matching window, which is a position of the peak, as the horizontal coordinate of the barycenter position of the feature amount in the matching window. As a result, in a case where the feature amount is large in the right portion in the matching window, the barycenter position of the feature amount in the matching window is a position indicated by a mark in which a cross is surrounded by a circle in the image in the middle part of FIG. 6.

In a case where the feature amount in the matching window is large in the upper left portion in the matching window as illustrated in the upper part of FIG. 7, the vertical distribution of the cumulative value obtained by accumulating the horizontal edge intensities in the horizontal direction has a cumulative value equal to or larger than the reference value and has a peak in the upper portion in the matching window as illustrated on the right side of the middle part of FIG. 7. In this case, the barycenter calculation unit 230 determines a vertical coordinate of a position of the upper portion in the matching window, which is a position of the peak, as the vertical coordinate of the barycenter position of the feature amount in the matching window. As illustrated on the lower side of the middle part of FIG. 7, the horizontal distribution of the cumulative value obtained by accumulating the horizontal edge intensities in the vertical direction has a cumulative value equal to or larger than the reference value and has a peak in the left portion in the matching window. In this case, the barycenter calculation unit 230 determines a horizontal coordinate of a position of the left portion in the matching window, which is a position of the peak, as the horizontal coordinate of the barycenter position of the feature amount in the matching window. As a result, in a case where the feature amount is large in the upper left portion in the matching window, the barycenter position of the feature amount in the matching window is a position indicated by a mark in which a cross is surrounded by a circle in the image in the middle part of FIG. 7.

In a case where the feature amount is not biased in the matching window as in a case where the texture is dispersed in the matching window, a parallax measurement error is small even in a case where the parallax is measured based on the center position of the matching window. On the other hand, in a case where the feature amount is largely biased in the matching window as in a case where a texture having a large luminance change locally exists in the matching window, when the parallax is measured based on the center position of the matching window, the parallax measurement error increases.

In a case where the feature amount is largely biased in the matching window, the parallax measurement is performed based on the barycenter position of the feature amount. This is because, in a case where the feature amount is largely biased in the matching window, a clue for searching for the corresponding point in the matching window is only a point where the horizontal edge having a large luminance change in the horizontal direction is locally present, and the position of the corresponding point is determined based on the point where the horizontal edge is present.

Therefore, when the distance measurement is performed based on the barycenter position of the feature amount in the matching window, matching with the reference position in the parallax measurement is made, so that a distance measurement error can be reduced. In a case where the distance measurement is performed based on the center position of the matching window, the in-vehicle environment recognition device 1 can reduce the distance measurement error by correcting the distance measurement result using the barycenter position of the feature amount in the matching window. As a result, the in-vehicle environment recognition device 1 can accurately reproduce the step present on the road by using the three-dimensional point group constituting the step candidate, and can accurately detect the step present on the road. However, whether or not to actually correct the distance measurement result is determined in consideration of a result of evaluating reliability of the stereo matching processing as described later and other information such as whether or not the line segment candidate is present in the matching window.

The reliability evaluation unit 250 evaluates reliability of the stereo matching processing. The reliability evaluation unit 250 determines whether or not distribution of the cumulative value of the horizontal edge intensities calculated by the in-window feature analysis unit 220 has a cumulative value equal to or larger than a predetermined reference value. In addition, the reliability evaluation unit 250 determines whether or not the distribution of the cumulative value of the horizontal edge intensities calculated by the in-window feature analysis unit 220 has a peak in the horizontal direction. The fact that the distribution of the cumulative value of the horizontal edge intensities has a peak in the horizontal direction can mean that the similarity calculated by the search unit 240 is high at one point in the horizontal direction.

The reliability evaluation unit 250 evaluates that the reliability of the stereo matching processing is high in a case where the distribution of the cumulative value of the horizontal edge intensities has a cumulative value equal to or larger than the reference value and the similarity is high at one point in the horizontal direction. That is, the reliability evaluation unit 250 evaluates that the reliability of the stereo matching processing is high in a case where the distribution of the cumulative value of the horizontal edge intensities has a cumulative value equal to or larger than the reference value and has a peak in the horizontal direction.

The reliability evaluation unit 250 evaluates that the reliability of the stereo matching processing is low in a case where the distribution of the cumulative value of the horizontal edge intensities does not have a cumulative value equal to or larger than the reference value or the similarity is not high at one point in the horizontal direction on the image. That is, the reliability evaluation unit 250 evaluates that the reliability of the stereo matching processing is low in a case where the distribution of the cumulative value of the horizontal edge intensities does not have a cumulative value equal to or larger than the reference value or does not have a peak in the horizontal direction.

The fact that the distribution of the cumulative value of the horizontal edge intensities does not have a cumulative value equal to or larger than the reference value can mean that an information source for specifying the corresponding point is missing. Even in a case where the distribution of the cumulative value of the horizontal edge intensities has a cumulative value equal to or larger than the reference value, if the cumulative value is equal to or larger than the reference value at a plurality of points in the horizontal direction on the image, it is suggested that there is a feature of the image similar to the background, and it is difficult to determine which of the plurality of points is a correct corresponding point. Note that, even in a case where the distribution of the cumulative value of the horizontal edge intensities has a cumulative value equal to or larger than the reference value and the similarity is high at one point in the horizontal direction on the image, if a line extending in the diagonal direction on the image is matched, the bias of the texture in the matching window, the Y misalignment, and the like may affect the reliability.

[Step Candidate Extraction Unit]

Figure 8:
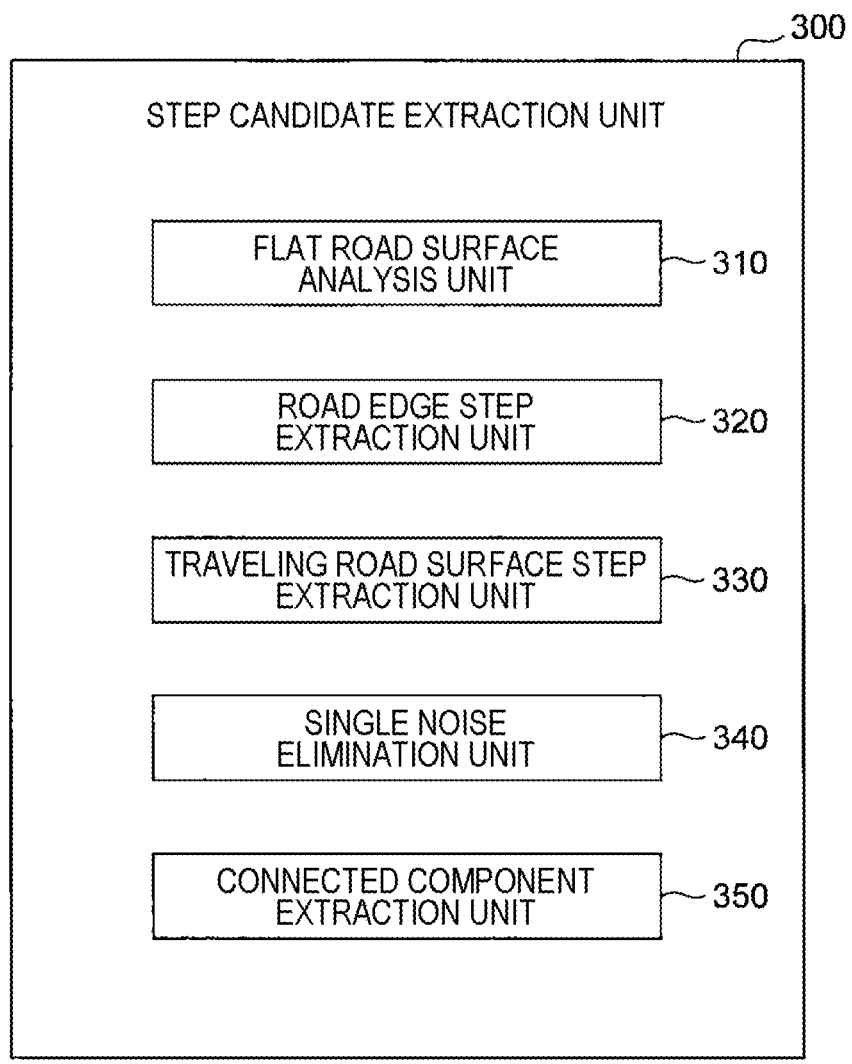
FIG. 8 is a diagram illustrating a configuration of a step candidate extraction unit illustrated in FIG. 1.

FIG. 8 is a diagram illustrating a configuration of the step candidate extraction unit 300 illustrated in FIG. 1. FIG. 9 is a diagram for describing processing performed by a flat road surface analysis unit 310 illustrated in FIG. 8. FIG. 10 is a diagram illustrating processing of a road edge step extraction unit 320 and a traveling road surface step extraction unit 330 illustrated in FIG. 8.

The step candidate extraction unit 300 extracts a step candidate having a height difference from the flat road surface portion, such as a step present at the road edge, a step such as a bump present on a traveling road surface, or an obstacle present on the traveling road surface. The step candidate extraction unit 300 checks accuracy and noise of the extracted step candidate.

As illustrated in FIG. 8, the step candidate extraction unit 300 includes the flat road surface analysis unit 310, the road edge step extraction unit 320, the traveling road surface step extraction unit 330, a single noise elimination unit 340, and a connected component extraction unit 350.

As illustrated in the upper part of FIG. 9, the flat road surface analysis unit 310 sets a traveling road surface of the traveling road on which the vehicle is predicted to travel as a processing target based on a result of predicting a course of the vehicle and a vehicle width. Then, the flat road surface analysis unit 310 analyzes a parallax of the processing target by using the parallax image generated by the stereo matching unit 200.

Specifically, the flat road surface analysis unit 310 converts the parallax of the processing target into three-dimensional spatial coordinates, generates a road surface cross-sectional view as illustrated in the lower part of FIG. 9, and estimates the height and inclination of the flat road surface portion. The flat road surface analysis unit 310 can convert the parallax of the processing target into three-dimensional spatial coordinates, acquire a three-dimensional point group of the processing target, and generate a road surface cross-sectional view as illustrated in the lower part of FIG. 9 by using the acquired three-dimensional point group. The road surface cross-sectional view illustrated in the lower part of FIG. 9 is a graph in which the horizontal axis represents the distance in the depth direction and the vertical axis represents the height of the traveling road surface.

At the time of generating the road surface cross-sectional view, the flat road surface analysis unit 310 scans a processing region 311 of the parallax image in the horizontal direction, and votes a mode of the height of the three-dimensional point group as one candidate point passing through a straight line representing the traveling road surface in the road surface cross-sectional view. The flat road surface analysis unit 310 repeats such voting processing in the depth direction to acquire a row of candidate points such as cross marks illustrated in the lower part of FIG. 9. The flat road surface analysis unit 310 performs straight line estimation processing on the obtained row of candidate points. In the straight line estimation processing, the flat road surface analysis unit 310 estimates a straight line through which the most candidate points pass.

Among the candidate points greatly deviating from the straight line estimated by the straight line estimation processing, the flat road surface analysis unit 310 extracts candidate points that certainly indicate a step present on the traveling road surface as candidate points constituting the step candidate, and eliminates other candidate points as noise. The candidate points that certainly indicate the step present on the traveling road surface are, for example, candidate points arranged in a semi-elliptical shape (semi-cylindrical shape) indicating a bump. As a result, the flat road surface analysis unit 310 can extract the step candidate such as a bump present on the traveling road surface.

The flat road surface analysis unit 310 performs fitting processing using only candidate points in the vicinity of the straight line, and estimates the height and inclination of the flat road surface portion. Since the flat road surface analysis unit 310 performs the fitting processing using only the candidate points in the vicinity of the straight line, it is possible to accurately estimate the height and inclination of the flat road surface portion.

As illustrated in the upper part of FIG. 10, the road edge step extraction unit 320 performs scanning in the horizontal direction from a center line of the traveling road surface toward the road edge, and extracts the candidate points constituting the step candidate present at the road edge. An example in which scanning is performed in the left direction from the center line of the traveling road surface toward the road edge in a case where there is a step between a sidewalk at the road edge and the traveling road is illustrated in the upper part of FIG. 10.

Specifically, the road edge step extraction unit 320 first checks whether or not the height of the center line of the traveling road surface greatly deviates from the height of the flat road surface portion estimated by the flat road surface analysis unit 310.

In a case where the height of the center line of the traveling road surface greatly deviates from the height of the flat road surface portion, it is determined as noise. In a case where it is determined as noise, the subsequent processing is skipped.

In a case where the height of the center line of the traveling road surface does not significantly deviate from the height of the flat road surface portion estimated by the flat road surface analysis unit 310, the road edge step extraction unit 320 performs the following processing. That is, the road edge step extraction unit 320 performs scanning in the horizontal direction from the center line of the traveling road surface toward the road edge, and acquires a three-dimensional point group constituting the traveling road surface in a scanning direction. The road edge step extraction unit 320 compares the height of the acquired three-dimensional point group with the height of the flat road surface portion estimated by the flat road surface analysis unit 310. Then, as illustrated in the middle part of FIG. 10, the road edge step extraction unit 320 generates a graph indicating the height of the acquired three-dimensional point group with respect to the flat road surface portion. The road surface cross-sectional view illustrated in the middle part of FIG. 10 is a graph in which the horizontal axis represents the distance from the center line of the traveling road surface in the left direction, and the vertical axis represents the height of the traveling road surface.

In the graph illustrated in the middle part of FIG. 10, in a case where a three-dimensional point group having a height in a certain range is continuous over a predetermined range in the scanning direction, the road edge step extraction unit 320 determines an average value of the heights in the certain range as the height of the flat road surface portion.

Then, the road edge step extraction unit 320 checks a change in height of the acquired three-dimensional point group. Specifically, the road edge step extraction unit 320 determines whether or not the height of the three-dimensional point group based on the height of the flat road surface portion has changed so as to satisfy a predetermined condition on an outer side of the traveling road surface in the horizontal direction. In a case where the height of the three-dimensional point group based on the height of the flat road surface portion has changed so as to satisfy the predetermined condition on the outer side of the traveling road surface in the horizontal direction, the road edge step extraction unit 320 extracts the three-dimensional point group whose height has changed so as to satisfy the predetermined condition as the candidate points constituting the step candidate present at the road edge.

For example, in a case where there is a sidewalk higher than the traveling road surface on the side of the traveling road, the three-dimensional point group is continuous in the horizontal direction for a while at the same height as the flat road surface portion, and then is continuous in the horizontal direction at a height larger than the flat road surface portion. In this case, for example, in a case where at least two three-dimensional point groups having a height larger than that of the flat road surface portion are continuous in the horizontal direction on the outer side of the road surface, the road edge step extraction unit 320 extracts a three-dimensional point group at a position at which the height that is the same as that of the flat road surface portion has changed to a height higher than that of the flat road surface portion as the candidate points constituting the step candidate present at the road edge. The above predetermined condition, that is, the condition for extraction as the candidate points constituting the step candidate present at the road edge is, for example, that at least two three-dimensional point groups having a height larger than that of the flat road surface portion are continuous in the horizontal direction on the outer side of the traveling road surface.

The road edge step extraction unit 320 shifts the position of the center line of the traveling road surface of interest in the depth direction and continues scanning in the horizontal direction from the shifted position of the center line. While repeating such processing, the road edge step extraction unit 320 can extract the candidate points constituting the step candidate present at the road edge.

As illustrated in the upper part of FIG. 10, the traveling road surface step extraction unit 330 performs scanning in the depth direction from the vehicle toward a vanishing point (infinite point), and extracts the candidate points constituting the step candidate present on the traveling road surface. Specifically, similarly to the road edge step extraction unit 320, the traveling road surface step extraction unit 330 performs scanning in the depth direction, acquires a three-dimensional point group constituting the traveling road surface in the scanning direction, and generates a road surface cross-sectional view as illustrated in the lower part of FIG. 10. The road surface cross-sectional view illustrated in the lower part of FIG. 10 is a graph in which the horizontal axis represents the distance in the depth direction and the vertical axis represents the height of the traveling road surface.

The traveling road surface step extraction unit 330 sets only a three-dimensional point group in the vicinity of the flat road surface portion estimated by the flat road surface analysis unit 310 as a processing target, and eliminates a three-dimensional point group greatly deviating from the estimated flat road surface portion as noise. The traveling road surface step extraction unit 330 determines the height of the flat road surface portion based on the height of the three-dimensional point group that is the processing target. The traveling road surface step extraction unit 330 checks a change in height of the three-dimensional point group based on the height of the flat road surface portion.

The candidate points constituting the step candidate such as a bump present on the traveling road surface have already been extracted by the flat road surface analysis unit 310. The traveling road surface step extraction unit 330 performs collation between the candidate points constituting the step candidate such as the bump extracted by the flat road surface analysis unit 310 and the three-dimensional point group acquired by scanning in the depth direction. In addition, in many cases, a three-dimensional point group of an obstacle or the like present on the traveling road surface is continuously higher in the depth direction than the flat road surface portion. The traveling road surface step extraction unit 330 checks whether or not the height of the three-dimensional point group is continuously larger in the depth direction than the height of the flat road surface portion, and extracts the three-dimensional point group whose height is continuously larger in the depth direction as the candidate points constituting the step candidate such as an obstacle present on the traveling road surface. As a result, the traveling road surface step extraction unit 330 extracts the candidate points constituting the step candidate such as an obstacle present on the traveling road surface.

Note that, in the processing performed by the traveling road surface step extraction unit 330, since only the three-dimensional point group on a line extending in the scanning direction is basically processed, the processing can be easily performed at high speed, but the processing may be easily affected by noise or the like. Final determination of whether or not the candidate points extracted by the traveling road surface step extraction unit 330 are noise is performed again.

The single noise elimination unit 340 eliminates noise by using a step point extracted by the road edge step extraction unit 320 or the traveling road surface step extraction unit 330. However, since the candidate points constituting the step candidate such as a bump present on the traveling road surface have already been extracted by the voting processing using the mode, the single noise elimination unit 340 does not eliminate the noise.

The connected component extraction unit 350 checks whether or not the candidate points left after the elimination of noise by the single noise elimination unit 340 have a certain degree of connectivity or aggregation. For example, the connected component extraction unit 350 checks whether or not the candidate points extracted by the road edge step extraction unit 320 include other candidate points that are continuous in a direction in which the traveling road extends. In addition, for example, the connected component extraction unit 350 checks whether or not the candidate points extracted by the traveling road surface step extraction unit 330 include other similar candidate points therearound in the horizontal direction or the depth direction. As a result, the connected component extraction unit 350 can check that the candidate points extracted by the road edge step extraction unit 320 or the traveling road surface step extraction unit 330 form the step candidate, and can extract the candidate points.

[Line Segment Candidate Extraction Unit]

FIG. II is a diagram illustrating a configuration of the line segment candidate extraction unit 400 illustrated in FIG. 1.

Figure 11:
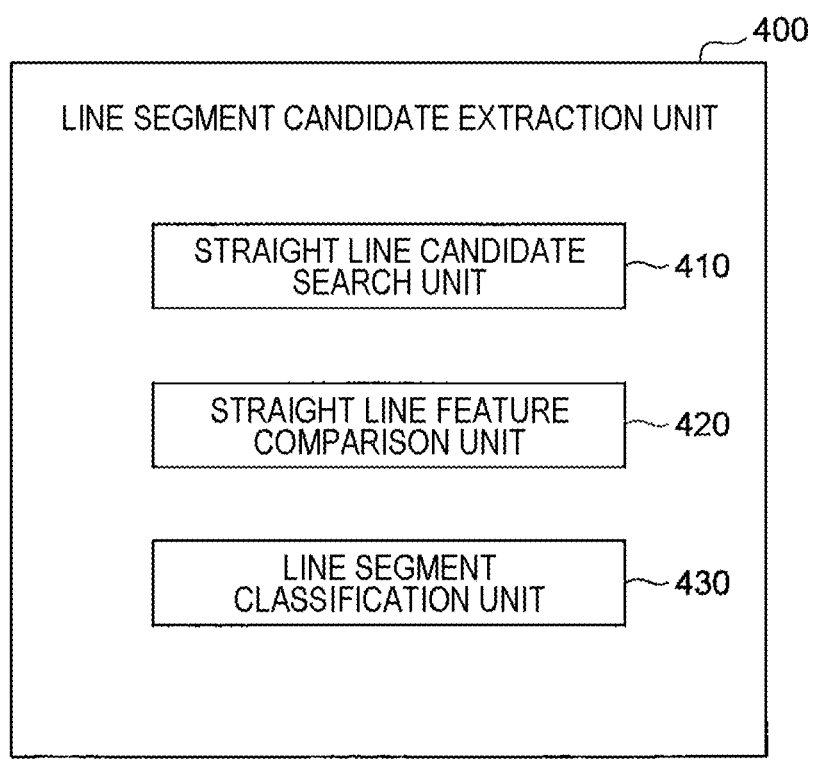
FIG. 11 is a diagram illustrating a configuration of a line segment candidate extraction unit illustrated in FIG. 1.

As illustrated in FIG. 11, the line segment candidate extraction unit 400 includes a straight line candidate search unit 410, a straight line feature comparison unit 420, and a line segment classification unit 430.

The straight line candidate search unit 410 searches for the straight line candidates by using the edge image of the right image generated by the edge generation unit 150. The edge image includes a horizontal edge having a luminance change in the horizontal direction and a vertical edge having a luminance change in the vertical direction. The straight line candidate search unit 410 combines the horizontal edge and the vertical edge of the edge image to generate an edge angle image. The edge angle image is an image in which the edge is vectorized using the horizontal edge intensity and the vertical edge intensity, and an angle formed by the vectorized edge and a coordinate axis is digitized and stored. The straight line candidate search unit 410 performs Hough transform by using the generated edge angle image to search for the straight line candidates.

The straight line feature comparison unit 420 checks whether or not the edge angles arranged on the straight line candidates searched by the straight line candidate search unit 410 have a certain degree of similarity, and checks that the straight line candidate is not a line drawn on a random texture. The straight line feature comparison unit 420 searches for a straight line candidate having a feature of the line segment candidate from among the straight line candidates searched by the straight line candidate search unit 410, and extracts the straight line candidate as the line segment candidate. For example, the straight line feature comparison unit 420 searches, by using the edge angle image and the edge image, for a straight line candidate that has a certain edge intensity, has high similarity in edge angle, has a start point and an end point, and is continuous in a line segment shape to some extent, and extracts the straight line candidate as the line segment candidate.

The line segment classification unit 430 classifies the line segment candidate extracted by the straight line feature comparison unit 420 according to the inclination of the line segment candidate, that is, the edge angle. Specifically, the line segment classification unit 430 classifies the extracted line segment candidate as a line segment candidate extending in the horizontal direction on the image, a line segment candidate extending in the vertical direction on the image, or a line segment candidate extending in the diagonal direction on the image.

[Analysis Unit]

Figure 12:
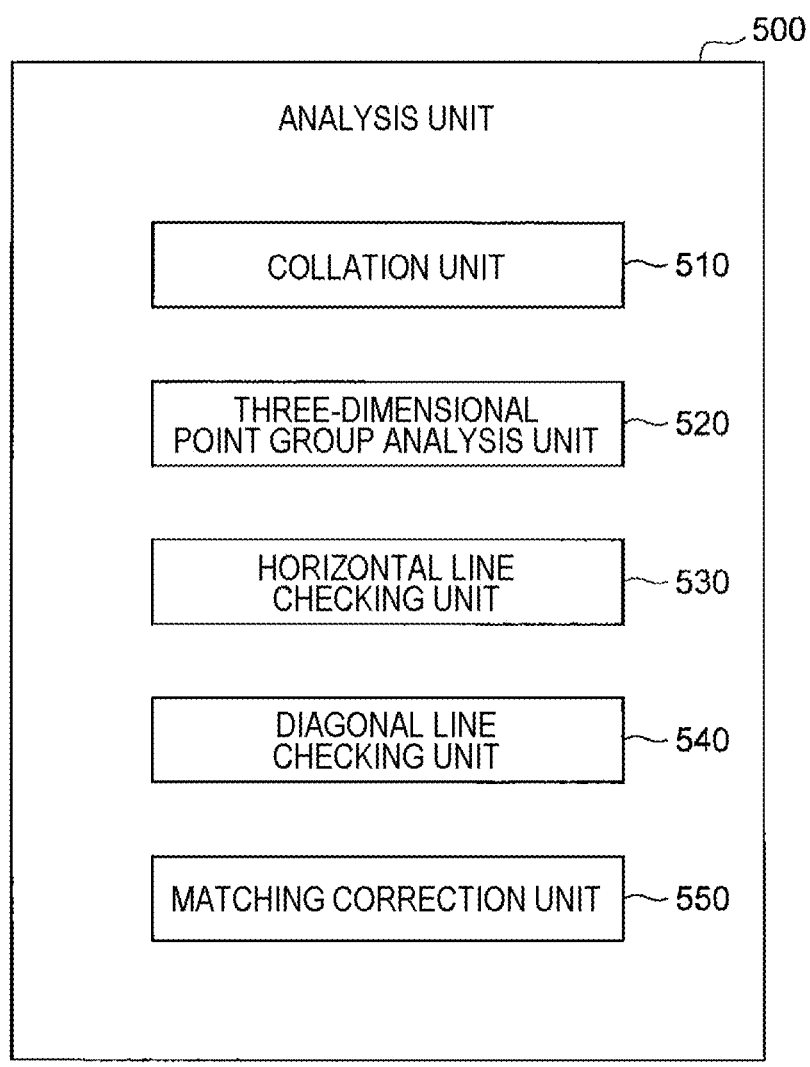
FIG. 12 is a diagram illustrating a configuration of an analysis unit illustrated in FIG. 1.
Figure 13:
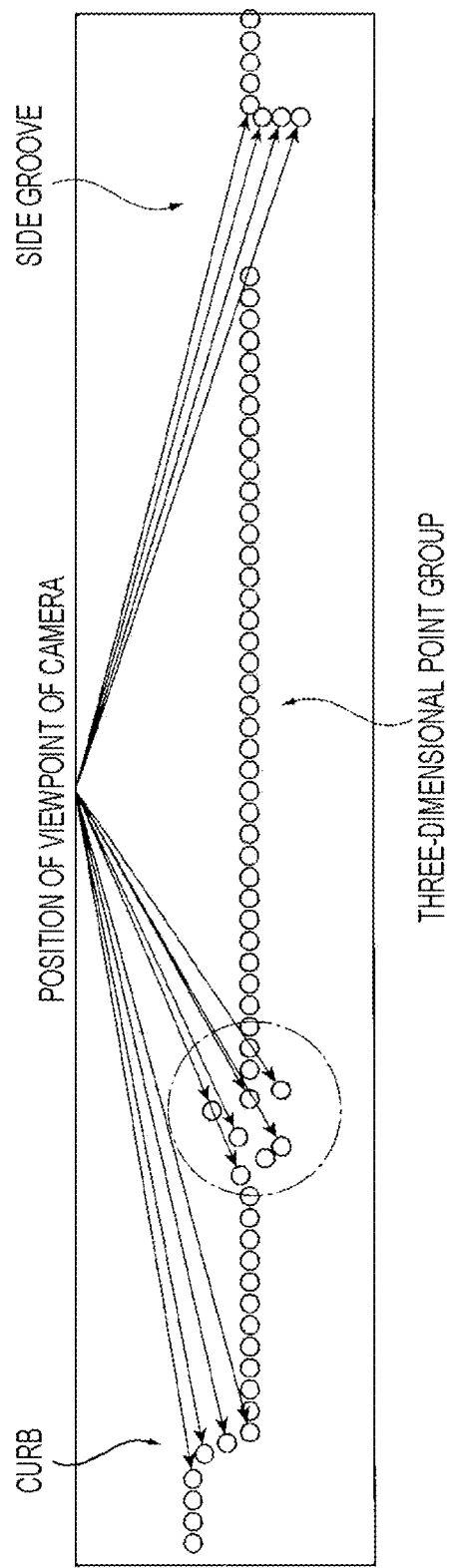
FIG. 13 is a diagram for describing processing of a three-dimensional point group analysis unit illustrated in FIG. 12.

FIG. 12 is a diagram illustrating a configuration of the analysis unit 500 illustrated in FIG. 1. FIG. 13 is a diagram for describing processing of a three-dimensional point group analysis unit 520 illustrated in FIG. 12. FIG. 14 is a diagram for describing processing performed by a horizontal line checking unit 530 illustrated in FIG. 12. FIG. 15 is a diagram for describing processing performed by a diagonal line checking unit 540 illustrated in FIG. 12, and is a diagram for describing a case where the cause of erroneous parallax measurement is deviation of the barycenter position of the feature amount in the matching window. FIG. 16 is a diagram for describing processing performed by the diagonal line checking unit 540 illustrated in FIG. 12, and is a diagram for describing a case where the cause of erroneous parallax measurement is Y misalignment.

As illustrated in FIG. 12, the analysis unit 500 includes a collation unit 510, a three-dimensional point group analysis unit 520, a horizontal line checking unit 530, a diagonal line checking unit 540, and a matching correction unit 550.

The collation unit 510 performs collation between the step candidate extracted by the step candidate extraction unit 300 and the line segment candidate extracted by the line segment candidate extraction unit 400. Specifically, the collation unit 510 checks whether or not the step candidate extracted by the step candidate extraction unit 300 overlaps with the line segment candidate extracted by the line segment candidate extraction unit 400 on the edge image or the image.

In a case where the step candidate extracted by the step candidate extraction unit 300 does not overlap with the line segment candidate extracted by the line segment candidate extraction unit 400 or overlaps with a line segment candidate extending in the vertical direction, the collation unit 510 determines that the step candidate is a step candidate indicating the step present on the road because the reliability of the stereo matching processing is high. That is, in this case, the collation unit 510 determines that the step candidate extracted the step candidate extraction unit 300 has high validity.

As a result, the in-vehicle environment recognition device 1 immediately determines that the step candidate having high validity indicates the step present on the road, so that it is possible to allocate a large amount of computer resources to analysis of a step candidate having low validity and perform processing such as re-measurement of the parallax. Therefore, the in-vehicle environment recognition device 1 can immediately suppress erroneous detection due to erroneous parallax measurement, and can accurately detect the step present on the road.

On the other hand, in a case where the step candidate extracted by the step candidate extraction unit 300 overlaps with a line segment candidate extending in the horizontal direction or the diagonal direction, the collation unit 510 does not immediately determine that the step candidate is a step candidate indicating the step present on the road. That is, in this case, the collation unit 510 determines that the step candidate extracted by the step candidate extraction unit 300 has low validity.

In particular, in a case where a step candidate having a small height difference, that is, a step candidate of which the height of the three-dimensional point group is not much different from, that of the flat road surface portion, overlaps with a line segment candidate extending in the horizontal direction or the diagonal direction, the step candidate may be a road surface marking extending in the horizontal direction or the diagonal direction, such as a line marking or a channelizing zone (zebra zone) drawn on the traveling road surface. There is a possibility that the step candidate having a small height difference overlapping with the line segment candidate extending in the horizontal direction or the diagonal direction is extracted due to occurrence of erroneous parallax measurement.

In a case where the validity of the step candidate extracted by the step candidate extraction unit 300 is low, the three-dimensional point group analysis unit 520 analyzes arrangement of the three-dimensional point group constituting the step candidate by using a method illustrated in FIG. 13. Then, the three-dimensional point group analysis unit 520 analyzes whether or not there is a possibility that the step candidate is extracted due to erroneous parallax measurement based on the arrangement of the three-dimensional point group constituting the step candidate.

As a result, the in-vehicle environment recognition device 1 can perform distance correction by re-measuring the parallax or perform noise elimination for the step candidate having low validity, and thus, can accurately reproduce only the step present on the road by using the three-dimensional point group constituting the step candidate. The in-vehicle environment recognition device 1 can suppress erroneous detection due to erroneous parallax measurement and accurately detect the step present on the road.

Specifically, the three-dimensional point group analysis unit 520 specifies a three-dimensional point group including the step candidate and distributed in the horizontal direction on the parallax image. As illustrated in FIG. 13, the three-dimensional point group analysis unit 520 generates a horizontal road surface cross-sectional view including the traveling road surface indicated by the specified three-dimensional point group. At this time, the three-dimensional point group analysis unit 520 sets a viewpoint of the camera on the road surface cross-sectional view, and generates the road surface cross-sectional view illustrating arrangement of the three-dimensional point group as viewed from the set viewpoint of the camera. The position of the viewpoint of the camera set on the road surface cross-sectional view may be a position corresponding to the vanishing point.

The three-dimensional position of the viewpoint of the camera set on the road surface cross-sectional view in the depth direction is different from the actual position, and the viewpoint does not exist on the road surface cross-sectional view. The three-dimensional point group analysis unit 520 sets the viewpoint of the camera on the road surface cross-sectional view on the assumption that the viewpoint of the camera exists on the road surface cross-sectional view. Then, the three-dimensional point group analysis unit 520 sets a straight line passing through each of the viewpoint of the camera on the road surface cross-sectional view and the three-dimensional point group.

In the road surface cross-sectional view generated by the three-dimensional point group analysis unit 520, a three-dimensional point group positioned immediately below the set viewpoint of the camera indicates the traveling road surface, and a three-dimensional point group positioned at an edge on the side of the area immediately below the camera in the horizontal direction indicates the road edge. FIG. 13 illustrates an example in which a side groove lower than the flat road surface portion is present at the right road edge in FIG. 13, and a curb higher than the flat road surface portion is present at the left road edge in FIG. 13. FIG. 13 illustrates a state in which the traveling road surface is cut and a side wall forming a hole portion of the side groove appears at the right road edge.

A plurality of straight lines passing through the viewpoint of the camera and each three-dimensional point group correspond to light beams incident on the camera, but since the light beams are basically not bent, the plurality of straight lines passing through the viewpoint of the camera and each three-dimensional point group are also basically not bent. Therefore, the plurality of straight lines passing through the viewpoint of the camera and each three-dimensional point group basically do not intersect each other or an interval between the plurality of straight lines is not uniform. In other words, an object for which the plurality of straight lines passing through the viewpoint of the camera and each three-dimensional point group intersect each other or an interval between the plurality of straight lines is not uniform is not imaged by the camera. Therefore, in a case where the plurality of straight lines passing through the viewpoint of the camera and each three-dimensional point group intersect each other or an interval between the plurality of straight lines is not uniform, it is highly likely that the step candidate constituted by the respective three-dimensional points passing through the plurality of straight lines has been extracted due to erroneous parallax measurement.

In a case where the plurality of straight lines passing through t viewpoint of the camera and each three-dimensional point group intersect each other or an interval between the plurality of straight lines is not uniform, the height of each three-dimensional point group with respect to the traveling road surface is likely to randomly increase or decrease. The three-dimensional point group whose height with respect to the traveling road surface randomly increases or decreases is a three-dimensional point group in which positions of a plurality of three-dimensional points, which are adjacent in the horizontal direction, in the height direction irregularly change to positions higher than the traveling road surface and positions lower than the traveling road surface.

The plurality of straight lines passing through each three-dimensional point group and the viewpoint of the camera, surrounded by a line with alternating long and short dashes in FIG. 13, intersect each other, and the height of the three-dimensional point group surrounded by the line with alternating long and short dashes with respect to the traveling road surface randomly increases or decreases. The three-dimensional point group analysis unit 520 determines that there is a possibility that the step candidate constituted by the three-dimensional point group surrounded by the line with alternating long and short dashes has been extracted due to erroneous parallax measurement.

That is, in a case where the plurality of straight lines passing through each three-dimensional point group constituting the step candidate and the viewpoint of the camera intersect each other or an interval between the plurality of straight lines is not uniform, the three-dimensional point group analysis unit 520 determines that there is a possibility that the step candidate constituted by the three-dimensional point group passing through the plurality of straight lines has been extracted due to erroneous parallax measurement.

As a result, the in-vehicle environment recognition device 1 can specify a step candidate that is likely to be extracted due to erroneous parallax measurement by using a simple method. The in-vehicle environment recognition device 1 can accurately reproduce only the step present on the road by using the three-dimensional point group constituting the step candidate.

Therefore, the in-vehicle environment recognition device 1 can easily suppress erroneous detection due to erroneous parallax measurement, and can accurately and easily detect the step present on the road.

Note that the three-dimensional point group analysis unit 520 can analyze whether or not there is a possibility that the step candidate overlapping with the line segment candidate extending in the horizontal direction or the diagonal direction has been extracted due to erroneous parallax measurement, by using a method other than the above-described method using the plurality of straight lines passing through each three-dimensional point group and the viewpoint of the camera. For example, in a case where the height of the three-dimensional point group constituting the step candidate with respect to the traveling road surface randomly increases or decreases, the three-dimensional point group analysis unit 520 determines that there is a possibility that the step candidate constituted by the three-dimensional point group has been extracted due to erroneous parallax measurement, the step candidate overlapping with the line segment candidate extending in the horizontal direction or the diagonal direction.

Specifically, the three-dimensional point group analysis unit 520 specifies a three-dimensional point at a position higher than the traveling road surface and a three-dimensional point at a position lower than the traveling road surface with reference to the three-dimensional point group constituting the traveling road surface.

Then, in a case where the specified three-dimensional points are adjacent in the horizontal direction within a predetermined range, the three-dimensional point group analysis unit 520 determines that the three-dimensional points are a three-dimensional point group whose height with respect to the traveling road surface randomly increases or decreases. Then, the three-dimensional point group analysis unit 520 can determine that there is a possibility that the step candidate constituted by the three-dimensional point group whose height with respect to the traveling road surface randomly increases or decreases has been extracted due to erroneous parallax measurement.

This method can be implemented more easily than the above-described method using the plurality of straight lines passing through each three-dimensional point group and the viewpoint of the camera. Therefore, the in-vehicle environment recognition device 1 can more easily suppress erroneous detection due to erroneous parallax measurement, and can accurately and more easily detect the step present on the road.

The horizontal line checking unit 530 finally determines whether or not the step candidate overlapping with the line segment candidate extending in the horizontal direction is highly likely to have been extracted due to erroneous parallax measurement. As illustrated in the upper part of FIG. 14, in a case where the left image and the right image are appropriately parallelized, and pixels having no feature amount other than the luminance change in the vertical direction are arranged in the horizontal direction, the reliability of the stereo matching processing evaluated by the reliability evaluation unit 250 is low. The horizontal line checking unit 530 searches for a line segment candidate in which most of pixel columns arranged in the horizontal direction have no feature amount other than the luminance change in the vertical direction, and checks that the reliability of the stereo matching processing is low.

Furthermore, as illustrated in a portion B in the lower part of FIG. 14, in a case of a line segment candidate constituted by pixel columns in which luminance distribution more slightly changes in the vertical direction as compared with the upper part of FIG. 14, it is difficult to accurately specify where in the horizontal direction the luminance distribution changes in the vertical direction at the time of quantizing the line segment candidate, and there is a possibility that the quantization cannot be accurately performed. Even such a small event can cause erroneous parallax measurement. Furthermore, the fact that the left image and the right image are not appropriately parallelized, that is, the occurrence of Y misalignment, can also be a cause of erroneous parallax measurement. In a case where the Y misalignment occurs, the overall reliability of the stereo matching processing is low, and the three-dimensional point group constituting the step candidate overlapping with the line segment candidate extending in the horizontal direction is often a three-dimensional point group whose height with respect to the traveling road surface randomly increases or decreases.

The horizontal line checking unit 530 determines that the step candidates overlapping with the line segment candidates extending in the horizontal direction as illustrated in the upper and lower parts of FIG. 14 are highly likely to have been extracted due to erroneous parallax measurement. In other words, the horizontal line checking unit 530 determines that there is a high possibility that erroneous parallax measurement has occurred due to the line segment candidates extending in the horizontal direction as illustrated in the upper and lower parts of FIG. 14.

The diagonal line checking unit 540 finally determines whether or not the step candidate overlapping with the line segment candidate extending in the diagonal direction is highly likely to have been extracted due to erroneous parallax measurement. Here, as illustrated in FIGS. 15 and 16, the processing performed by the diagonal line checking unit 540 will be described by exemplifying a case where a white line appears in the upper left portion of the matching window in the right image. The white line is a road surface marking, and includes a road marking and a line marking. The road marking is a road surface marking such as a channelizing zone (zebra zone) or a stop line. The line marking is a road surface marking such as a boundary line between a plurality of traveling roads (for example, a boundary line of a vehicular traffic zone) or a boundary line between a traveling road and a road edge (for example, an edge line). In the present embodiment, a case where an edge line appears as the white line in the upper left portion of the matching window will be described as an example.

The upper part of FIG. 15 illustrates a case where the barycenter position of the feature amount in the matching window greatly deviates from the center position of the matching window. The middle part of FIG. 15 is an enlarged view of the matching window illustrated in the upper part of FIG. 15. The lower part of FIG. 15 illustrates a case where the barycenter position of the feature amount in the matching window hardly deviates from the center position of the matching window as compared with the upper part and the middle part of FIG. 15. Note that, in the middle part and the lower part of FIG. 15, a mark in which a cross is surrounded by a circle indicates the barycenter position of the feature amount in the matching window, and a mark in which diagonal lines are surrounded by a circle indicates the center position of the matching window.

In a distance measurement method of the stereo camera using the matching window, distance measurement is often performed based on the center position of the matching window. On the other hand, as mentioned above in the description of the barycenter calculation unit 230, in a case where the feature amount is biased in the matching window, it is more accurate to measure the parallax based on the barycenter position of the feature amount in the matching window. However, in the normal stereo matching processing, the parallax measured based on the barycenter position of the feature amount is often treated as the parallax measured based on the center position of the matching window, which may cause erroneous parallax measurement.

For example, as illustrated in the middle part of FIG. 15, in a case where the white line appears only in the upper left portion of the matching window and there is no other conspicuous feature, the feature amount is biased in the matching window. In this case, the barycenter position of the feature amount in the matching window is located in the upper left portion much away from the center position of the matching window by GZ and GX. In a case where the parallax is measured based on the barycenter position of the feature amount in the matching window, the measurement error is small. However, in a case where the parallax is measured based on the center position of the matching window, LZ and LX become problems, and the parallax measurement error is large for the size of the matching window. The distance measurement error also increases according to the parallax measurement error.

On the other hand, as illustrated in the lower part of FIG. 15, in a case where the white line appears so as to pass through the center position of the matching window and there is no other conspicuous feature, the barycenter position of the feature amount in the matching window and the center position of the matching window are substantially the same position. In this case, even in a case where the parallax is measured based on the center position of the matching window, the parallax measurement error is small, and the distance measurement error is also small.

The diagonal line checking unit 540 determines that the step candidates overlapping with the line segment candidates extending in the diagonal direction as illustrated in the upper and middle parts of FIG. 15 are highly likely to have been extracted due to erroneous parallax measurement. In other words, the diagonal line checking unit 540 determines that there is a high possibility that erroneous parallax measurement has occurred due to the line segment candidates extending in the diagonal direction as illustrated in the upper and middle parts of FIG. 15.

The upper part of FIG. 16 illustrates a case where the left image and the right image are appropriately parallelized and the Y misalignment does not occur. The lower part of FIG. 16 illustrates a case where the left image and the right image are not appropriately parallelized and the misalignment occurs.

In a case where the left image and the right image are not appropriately parallelized and the Y misalignment occurs, erroneous parallax measurement occurs. Originally, it is desired to move the matching window of the left image in the horizontal direction with respect to the matching window indicated by a solid line in the right image in the lower part of FIG. 16 to search for the corresponding point. In a case where the Y misalignment occurs, the matching window of the left image is moved in the horizontal direction with respect to the matching window indicated by a broken line in the right image in the lower part of FIG. 16 to search for the corresponding point. That is, in a case where the Y misalignment occurs, the height of the left image and the height of the right image are not the same, so that the corresponding points of the right image and the left image are searched for at different heights, which may cause erroneous parallax measurement.

The diagonal line checking unit 540 checks whether or not the Y misalignment has occurred for a line segment candidate extending in the diagonal direction for which it has been determined that there is a high possibility that erroneous parallax measurement has occurred. Specifically, the diagonal line checking unit 540 resets the matching window by shifting any one of the matching window set in the right image and the matching window set in the left image by a predetermined amount in the vertical direction. The diagonal line checking unit 540 performs the stereo matching processing on the line segment candidate extending in the diagonal direction by using the reset matching window, and recalculates the similarity. At this time, the diagonal line checking unit 540 may reset the matching window by shifting the matching window by the predetermined amount upward and downward in the vertical direction a plurality of times, and recalculate the similarity. The diagonal line checking unit 540 compares the similarity in a case of using the reset matching window with the similarity in a case of using the existing matching window before resetting. In a case where the Y misalignment does not occur, the similarity in a case of using the existing matching window is higher than the similarity in a case of using the reset matching window. In a case where the Y misalignment occurs, the similarity in a case of using the reset matching window is higher than the similarity in a case of using the existing matching window. As a result, the diagonal line checking unit 540 can check whether or not the Y misalignment has occurred for the line segment candidate extending in the diagonal direction for which it has been determined that there is a high possibility that erroneous parallax measurement has occurred.

Note that the horizontal line checking unit 530 checks whether or not the Y misalignment has occurred for a line segment candidate extending in the horizontal direction for which it has been determined that there is a high possibility that erroneous parallax measurement has occurred, by using a method similar to that of the diagonal line checking unit 540.

The matching correction unit 550 corrects the distance according to the parallax for the line segment candidate for which it has been determined by the horizontal line checking unit 530 and the diagonal line checking unit 540 that there is a high possibility that erroneous parallax measurement has occurred, according to the type of the cause of erroneous parallax measurement.

The matching correction unit 550 corrects the distance according to the parallax by using the barycenter position of the feature amount in the matching window for the line segment candidate extending in the diagonal direction as illustrated in the upper part and the middle part of FIG. 15. For example, the matching correction unit 550 corrects the distance according to the parallax by using the differences ΔZ and ΔX between the barycenter position of the feature amount in the matching window and the center position of the matching window.

As a result, the in-vehicle environment recognition device 1 can reduce the parallax measurement error caused by the erroneous parallax measurement and reduce the distance measurement error even in a case where the feature amount in the matching window is biased due to the bias of the texture or the like. The in-vehicle environment recognition device 1 can accurately reproduce the step present on the road by using the three-dimensional point group constituting the step candidate. Therefore, the in-vehicle environment recognition device 1 can suppress erroneous detection due to erroneous parallax measurement, and can accurately detect the step present on the road.

The matching correction unit 550 parallelizes the left image and the right image and corrects the distance according to the parallax for the line segment candidate extending in the diagonal direction or the line segment candidate extending in the horizontal direction as illustrated in the lower part of FIG. 16, based on a result of processing of checking the occurrence of the Y misalignment by the horizontal line checking unit 530 or the diagonal line checking unit 540, in a case where the occurrence of the Y misalignment is confirmed.

That is, the horizontal line checking unit 530 or the diagonal line checking unit 540 compares the similarity in a case of using the matching window reset by shifting by a predetermined amount in the vertical direction with the similarity in a case of using the existing matching window before resetting, thereby checking whether or not the misalignment has occurred. The matching correction unit 550 corrects the distance according to the parallax based on the similarity comparison result. Specifically, the matching correction unit 550 specifies the matching window used for the stereo matching processing, the matching window having the highest similarity in the similarity comparison result. The matching correction unit 550 parallelizes the left image and the right image according to a shifting amount of the specified matching window from the existing matching window. The matching correction unit 550 performs the stereo matching processing again on the parallelized left image and right image. The matching correction unit 550 re-measures the parallax and corrects the distance according to the parallax based on the result of the stereo matching processing performed again.

As a result, even in a case where the left image and the right image are not appropriately parallelized, the in-vehicle environment recognition device 1 can reduce the parallax measurement error caused by the erroneous parallax measurement and reduce the distance measurement error. The in-vehicle environment recognition device 1 can accurately reproduce the step present on the road by using the three-dimensional point group constituting the step candidate. Therefore, the in-vehicle environment recognition device 1 can suppress erroneous detection due to erroneous parallax measurement, and can accurately detect the step present on the road.

The matching correction unit 550 increases the size of the matching window in the vertical direction and performs the stereo matching processing again for the line segment candidates extending in the horizontal direction as illustrated in the upper and lower parts of FIG. 14. Specifically, the matching correction unit 550 increases the size of the matching window in the vertical direction and resets the matching window until a line segment candidate extending in the vertical direction (that is, the horizontal edge) around the line segment candidate extending in the horizontal direction enters the matching window. The matching correction unit 550 performs the stereo matching processing again for the line segment candidate extending in the horizontal direction by using the reset matching window. The matching correction unit 550 re-measures the parallax and corrects the distance according to the parallax based on the result of the stereo matching processing performed again. As the size of the matching window in the vertical direction is increased, it may be difficult to reproduce the surrounding three-dimensional shape in detail, but the horizontal edge outside the matching window easily enters the matching window. Since the horizontal edge is a clue for searching for the corresponding points of the pair of images, when the horizontal edge enters the matching window, the corresponding point is easily searched for correctly, and the reliability of the stereo matching processing can be improved.

As a result, the in-vehicle environment recognition device 1 can reduce the parallax measurement error caused by the erroneous parallax measurement and reduce the distance measurement error even in a case where the line segment candidate extending in the horizontal direction cannot be accurately quantized because the line segment candidate extending in the horizontal direction is constituted by pixel columns in which luminance distribution slightly changes in the vertical direction. The in-vehicle environment recognition device 1 can accurately reproduce the step present on the road by using the three-dimensional point group constituting the step candidate. Therefore, the in-vehicle environment recognition device 1 can suppress erroneous detection due to erroneous parallax measurement, and can accurately detect the step present on the road.

Note that the matching correction unit 550 may perform the stereo matching processing again by increasing the size of the matching window in the vertical direction in a case where the occurrence of the Y misalignment is confirmed, for the line segment candidate extending in the diagonal direction or the line segment candidate extending in the horizontal direction as illustrated in the lower part of FIG. 16. The matching correction unit 550 may re-measure the parallax and corrects the distance according to the parallax based on the result of the stereo matching processing performed again. By increasing the size of the matching window in the vertical direction, the matching correction unit 550 can reduce an influence of the Y misalignment on the matching window, and can reduce the parallax measurement error and the distance measurement error.

In addition, the matching correction unit 550 masks an edge having an edge intensity equal to or higher than a predetermined intensity among edges present in the matching window, for the line segment candidate extending in the horizontal direction or the diagonal direction for which it has been determined that there is a high possibility that erroneous parallax measurement has occurred. The matching correction unit 550 performs the stereo matching processing again for the line segment candidate extending in the horizontal direction or the diagonal direction except for the masked edge. The matching correction unit 550 re-measures the parallax and corrects the distance according to the parallax based on the result of the stereo matching processing performed again.

When the edge that has an edge intensity equal to or higher than the predetermined intensity and is present in the matching window is masked, the bias of the feature amount is reduced in the matching window. When the bias of the feature amount is reduced in the matching window, the barycenter position of the feature amount and the center position of the matching window become close to each other. Therefore, even if the parallax is measured based on the center position of the matching window, the parallax measurement error becomes small.

As a result, the in-vehicle environment recognition device 1 can reduce the parallax measurement error caused by the erroneous parallax measurement and reduce the distance measurement error even in a case where the texture in the matching window is biased. The in-vehicle environment recognition device 1 can accurately reproduce the step present on the road by using the three-dimensional point group constituting the step candidate. Therefore, the in-vehicle environment recognition device 1 can suppress erroneous detection due to erroneous parallax measurement, and can accurately detect the step present on the road.

Here, in the stereo matching processing, as described above, the stereo matching unit 200 calculates the similarity by using the intensity of the edge in the matching window as the feature amount in the matching window. That is, the stereo matching unit 200 performs the stereo matching processing by a method in which the magnitude of the luminance change in the matching window directly affects the calculation of the similarity.

The matching correction unit 550 can perform the stereo matching processing again by a method in which the magnitude of the luminance change in the matching window does not directly affect the calculation of the similarity. For example, the matching correction unit 550 can calculate the similarity by using an angle of the edge in the matching window as the feature amount in the matching window. The angle of the edge is an angle formed by the vectorized edge and the coordinate axis, the vectorized edge being obtained by vectorizing the edge using the intensity of the horizontal edge and the intensity of the vertical edge.

Specifically, the matching correction unit 550 specifies the angle of the edge calculated from the intensity of the vertical edge and the intensity of the horizontal edge in the matching window, for the line segment candidate extending in the horizontal direction or the diagonal direction for which it has been determined that there is a high possibility that erroneous measurement parallax has occurred. At this time, the matching correction unit 550 may specify the angle of the edge from the edge angle image generated by the straight line candidate search unit 410. The matching correction unit 550 performs the stereo matching processing again for the line segment candidate extending in the horizontal direction or the diagonal direction by using the specified angle of the edge for the calculation of the similarity. The matching correction unit 550 re-measures the parallax and corrects the distance according to the parallax based on the result of the stereo matching processing performed again.

In a case where the angle of the edge is used for calculating the similarity, the stereo matching processing can be performed as long as the line segment candidate extending in the horizontal direction or the diagonal direction includes the edge having the minimum intensity. In this case, not only the edge having a high intensity but also the edge having the minimum intensity present in the matching window can be reflected in the calculation of the similarity. Therefore, as the similarity is calculated using the angle of the edge, the matching correction unit 550 can reduce the erroneous parallax measurement caused by dependence only on the edge having a high intensity.

As a result, the in-vehicle environment recognition device 1 can reduce the parallax measurement error generated due to the erroneous parallax measurement and reduce the distance measurement error, so that the step present on the road can be accurately reproduced by the three-dimensional point group constituting the step candidate. Therefore, the in-vehicle environment recognition device 1 can suppress erroneous detection due to erroneous parallax measurement, and can accurately detect the step present on the road.

[Three-Dimensional Object Detection Unit]

Figure 17:
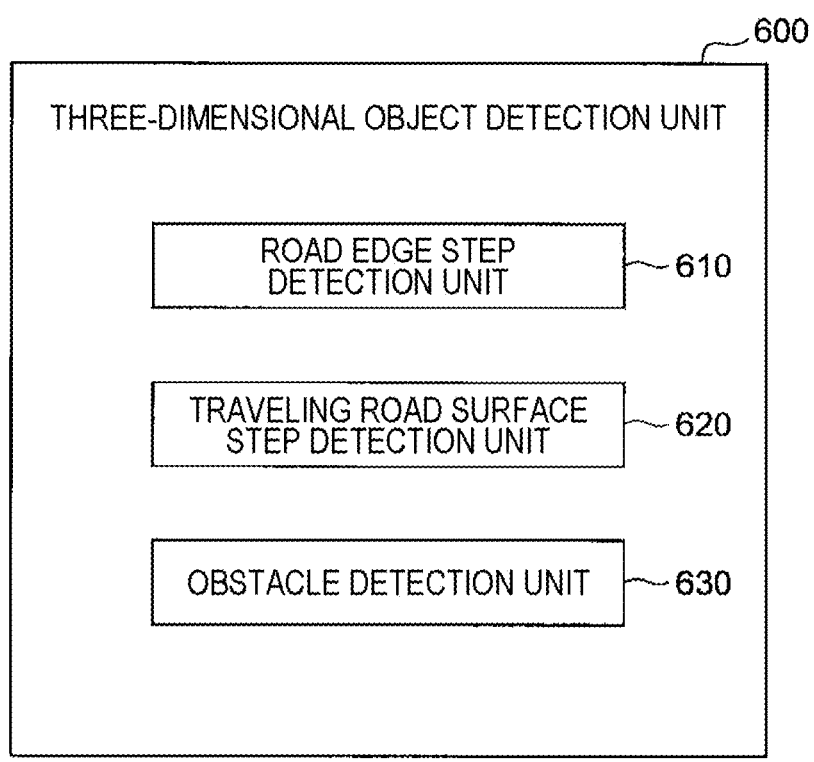
FIG. 17 is a diagram illustrating a configuration of a three-dimensional object detection unit illustrated in FIG. 1.

FIG. 17 is a diagram illustrating a configuration of the three-dimensional object detection unit 600 illustrated in FIG. 1.

As illustrated in FIG. 17, the three-dimensional object detection unit 600 includes a road edge step detection unit 610, a traveling road surface step detection unit 620, and an obstacle detection unit 630.

The three-dimensional object detection unit 600 acquires the three-dimensional point group again from the result of the stereo matching processing performed again by the matching correction unit 550. Then, the three-dimensional object detection unit 600 corrects the height and inclination of the flat road surface portion by using the three-dimensional point group acquired again, and performs processing of detecting the step present on the road by using the corrected flat road surface portion. The three-dimensional object detection unit 600 may detect the three-dimensional object by using the already acquired three-dimensional point group. That is, the three-dimensional object detection unit 600 may perform processing of detecting the step present on the road by using the height and inclination of the flat road surface portion estimated by the flat road surface analysis unit 310.

The road edge step detection unit 610 detects, based on the estimation result related to the flat road surface portion and the step candidate extracted by the connected component extraction unit 350, the step present at the road edge and identifies the step present at the road edge and the road surface marking. For example, the road edge step detection unit 610 reconfirms that, among the step candidates extracted by the road edge step extraction unit 320 and extracted by the connected component extraction unit 350, a step candidate for which it has not been determined that there is a high possibility of being extracted due to erroneous parallax measurement has a height difference from the corrected flat road surface portion. Further, for example, the road edge step detection unit 610 compares the three-dimensional point group acquired again with the corrected flat road surface portion to confirm that, among the step candidates extracted by the road edge step extraction unit 320 and extracted by the connected component extraction unit 350, a step candidate for which it has been determined that there is a high possibility of being extracted due to the erroneous parallax measurement has been erroneously extracted as the step candidate.

Accordingly, the road edge step detection unit 610 can reliably identify the step present at the road edge and the step candidate erroneously extracted due to erroneous parallax measurement caused for the line segment candidate extending in the horizontal direction or the diagonal direction. In particular, the road edge step detection unit 610 can reliably identify a step that has a small height difference and is present between a traveling road surface and a shoulder, and the road surface marking extending in the horizontal direction or the diagonal direction such as a line marking or a channelizing zone (zebra zone) drawn on the traveling road surface. The road edge step detection unit 610 can also perform time-series processing in order to remove an influence of the channelizing zone (zebra zone).

The traveling road surface step detection unit 620 detects the step present on the traveling road surface based on the corrected flat road surface portion. For the step candidates extracted by the traveling road surface step extraction unit 330 and extracted by the connected component extraction unit 350, the traveling road surface step detection unit 620 eliminates the three-dimensional point group greatly deviating from the corrected flat road surface portion as noise. Then, the traveling road surface step detection unit 620 checks the shape of the remaining three-dimensional point group, and detects the step such as a bump present on the traveling road surface. That is, the traveling road surface step detection unit 620 detects a step that can give an impact to the vehicle although the step is a step of the traveling road surface that the vehicle can easily pass during traveling.

The obstacle detection unit 630 detects an obstacle or the like present on the traveling road surface based on the corrected flat road surface portion. The obstacle detection unit 630 detects an obstacle or the like present on the traveling road surface by determining whether or not a three-dimensional point group having a height difference from the corrected flat road surface portion has a certain degree of aggregation. The parallax used at this time is obtained by correcting the parallax measurement result by the matching correction unit 550, and the obstacle detection unit 630 can accurately detect even an obstacle having a small height difference.

[Alarm Control Unit]

The alarm control unit 700 outputs control information for controlling vehicle traveling or alarm notification to the control device of the vehicle based on the detection result of the three-dimensional object detection unit 600.

For example, in a case where it is detected that the vehicle is likely to deviate from the line marking of the traveling road based on the detection result of the road edge step detection unit 610, the alarm control unit 700 outputs, to the control device of the vehicle, control information for alarm notification, control information for steering angle adjustment, and control information for vehicle speed reduction.

As a result, the alarm control unit 700 can prevent the vehicle from deviating from the line marking and can prevent the vehicle from colliding with a curb, a wall, or the like present at the road edge.

In addition, for example, in a case where it is detected that there is a step such as a bump on the traveling road surface based on the detection result of the traveling road surface step detection unit 620, the alarm control unit 700 outputs, to the control device of the vehicle, control information for vehicle speed reduction and control information for setting change for impact absorption by an active suspension. As a result, the alarm control unit 700 can alleviate an impact applied to the vehicle when the vehicle passes through the step present on the traveling road surface.

In addition, for example, in a case where it is detected that there is an obstacle or the like on the traveling road surface and the vehicle is likely to collide with the obstacle based on the detection result of the obstacle detection unit 630, the alarm control unit 700 outputs, to the control device of the vehicle, braking control information for stopping traveling and steering angle control information for avoiding the obstacle so as to prevent collision with the obstacle. As a result, the alarm control unit 700 can prevent the vehicle from colliding with an obstacle present on the traveling road surface. Note that the alarm control unit 700 may output the control information for alarm notification to the control device of the vehicle before outputting the braking control information and the steering angle control information.

The in-vehicle environment recognition device 1 can output the control information for controlling vehicle traveling or alarm notification to the control device of the vehicle after suppressing erroneous detection due to erroneous parallax measurement and accurately detecting the step present on the road. Therefore, the in-vehicle environment recognition device 1 can enhance a preventive safety function, a driving assistance function, and the like of the vehicle.

[Surrounding Environment Recognition Processing]

Figure 18:
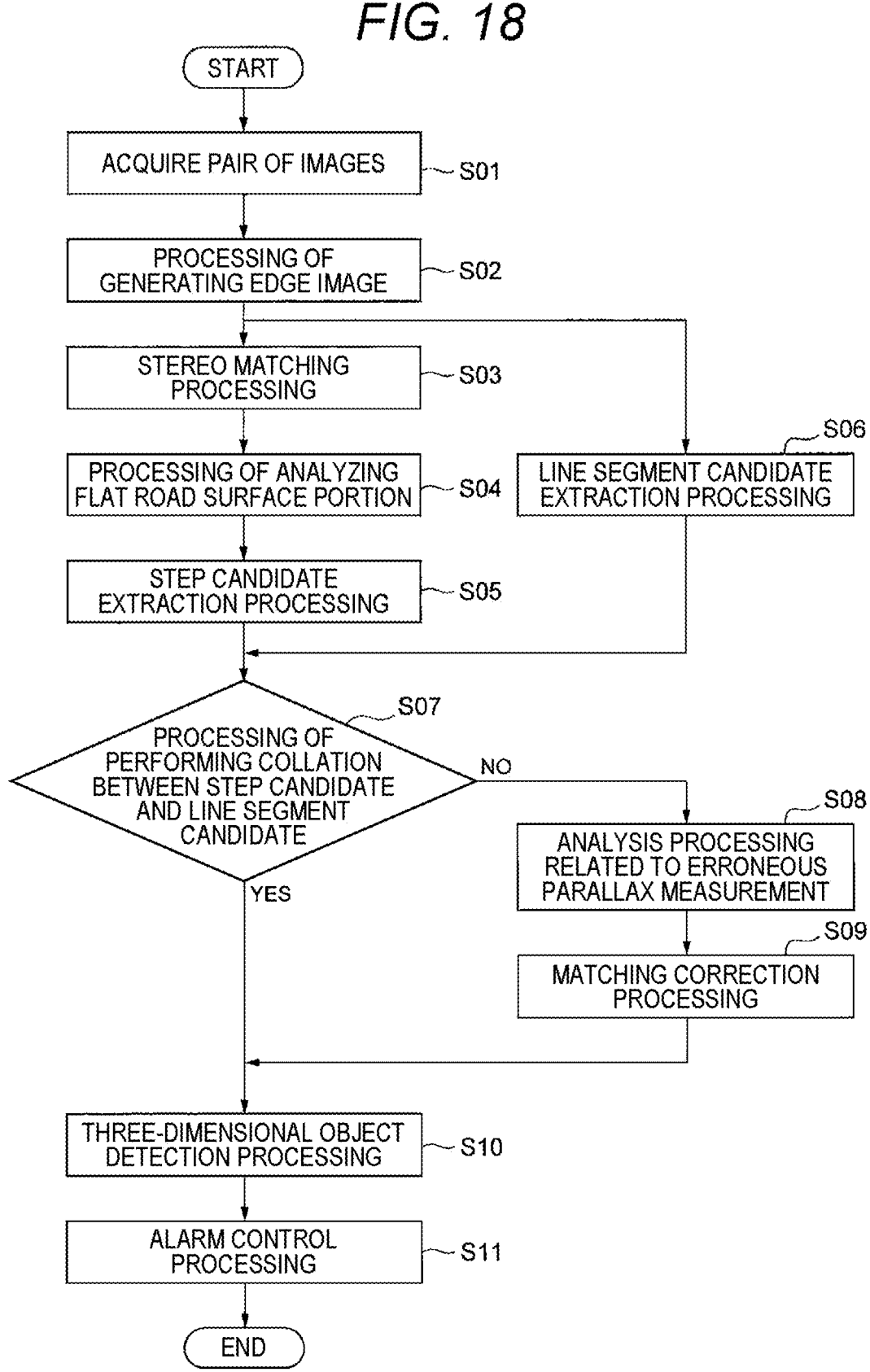
FIG. 18 is a flowchart illustrating surrounding environment recognition processing performed by the in-vehicle environment recognition device illustrated in FIG. 1.

FIG. 18 is a flowchart illustrating the surrounding environment recognition processing performed by the in-vehicle environment recognition device 1 illustrated in FIG. 1.

Once the pair of cameras included in the image acquisition unit 110 acquires a pair of images (Step S01), the in-vehicle environment recognition device 1 performs edge image generation processing (Step S02). Specifically, the in-vehicle environment recognition device 1 generates the edge image by performing the edge extraction processing on the right image that is a reference image among the pair of images acquired by the pair of cameras.

After calibrating the sensitivity of the pair of cameras and the geometric condition of the pair of acquired images, the in-vehicle environment recognition device performs the stereo matching processing (Step S03) and searches for the corresponding points of the pair of images. Once the corresponding points of the pair of images are searched for, positions of three points in a three-dimensional space are specified, and a parallax between the pair of images can be measured. The in-vehicle environment recognition device 1 measures the parallax between the pair of images, generates the parallax image, and measures a distance in the depth direction from the measured parallax based on the principle of triangulation. As a result, a three-dimensional point group in a visual field of the pair of cameras can be acquired.

The in-vehicle environment recognition device performs analysis processing for the flat road surface portion of the traveling road (Step S04). Specifically, the in-vehicle environment recognition device 1 estimates the height and inclination of the flat road surface portion based on the acquired three-dimensional point group. As a result, a positional relationship between the pair of cameras and the traveling road surface can be estimated.

The in-vehicle environment recognition device performs processing of extracting the step candidate present on the road (Step S05). Specifically, the in-vehicle environment recognition device 1 specifies a three-dimensional point group having a height difference from the flat road surface portion estimated in Step S04, and extracts a step candidate present on the road based on the height of the specified three-dimensional point group. Thereafter, the in-vehicle environment recognition device 1 proceeds to Step S07.

In addition, the in-vehicle environment recognition device 1 performs processing of extracting the line segment candidate in parallel with the pieces of processing of Steps S03 to S05 (Step S06). Specifically, the in-vehicle environment recognition device 1 searches for straight line candidates included in the image based on the edge image generated in Step S02, and extracts a line segment candidate having a start point and an end point from among the searched straight line candidates. The in-vehicle environment recognition device 1 classifies the extracted line segment candidate as a line segment candidate extending in the vertical direction, a line segment candidate extending in the horizontal direction, or a line segment candidate extending in the diagonal direction according to the inclination of the line segment candidate on the image. The in-vehicle environment recognition device 1 checks whether or not the line segment candidate is present on a continuous edge, eliminates the minimum noise, and then proceeds to Step S07.

The in-vehicle environment recognition device performs processing of performing collation between the step candidate extracted in Step S05 and the line segment candidate extracted in Step S06 (Step S07). Then, the in-vehicle environment recognition device 1 analyzes validity of the extracted step candidate based on the collation result and the inclination of the line segment candidate.

Specifically, in a case where the step candidate does not overlap with the line segment candidate or in a case where the step candidate overlaps with the line segment candidate extending in the vertical direction, there is a high possibility that the stereo matching processing has been correctly performed, and thus, the in-vehicle environment recognition device 1 determines that the step candidate has high validity (Step S07: YES), and proceeds to Step S10. On the other hand, in a case where the step candidate overlaps with the line segment candidate extending in the horizontal direction or the diagonal direction, there is a high possibility that erroneous parallax measurement is included in the result of the stereo matching processing. Therefore, the in-vehicle environment recognition device 1 determines that the step candidate has low validity (Step S07: NO), and proceeds to Step S08.

The in-vehicle environment recognition device performs analysis processing related to erroneous parallax measurement (Step S08). Specifically, the in-vehicle environment recognition device 1 analyzes arrangement of the three-dimensional point group constituting the step candidate, and determines whether or not there is a possibility that the step candidate has been extracted due to erroneous parallax measurement.

In a case where there is a possibility that the step candidate is extracted due to erroneous parallax measurement, the in-vehicle environment recognition device 1 analyzes the cause of the erroneous parallax measurement. For example, the in-vehicle environment recognition device 1 checks the fact that the line segment candidate extending in the horizontal direction cannot be accurately quantized because the line segment candidate extending in the horizontal direction is constituted by pixel columns in which the luminance distribution slightly changes in the vertical direction (see the lower part of FIG. 14), the occurrence of the Y misalignment (see the lower part of FIG. 16), the fact that distortion of the camera cannot be completely corrected and the distortion partially remains, and the like, to analyze the cause of the erroneous parallax measurement. Furthermore, for example, the in-vehicle environment recognition device 1 checks the fact that the barycenter position of the feature amount is biased along with the bias of the texture in the matching window (see the middle part of FIG. 15), the occurrence of the Y misalignment (see the lower part of FIG. 16), and the like for the line segment candidate extending in the diagonal direction to analyze the cause of the erroneous parallax measurement.

In a case where the in-vehicle environment recognition device 1 analyzes the cause of the erroneous parallax measurement and it is determined that the step candidate is highly likely to have been extracted due to erroneous parallax measurement, the processing proceeds to Step S09. On the other hand, in a case where the in-vehicle environment recognition device 1 analyzes the cause of the erroneous parallax measurement and it is determined that the step candidate is less likely to have been extracted due to erroneous parallax measurement, the processing proceeds to Step S10.

In a case where it is determined that the step candidate is highly likely to have been extracted due to erroneous parallax measurement, the in-vehicle environment recognition device 1 performs matching correction processing (Step S09). Specifically, the in-vehicle environment recognition device 1 re-measures the parallax by performing the stereo matching processing again, and corrects the distance according to the parallax or eliminate the extracted step candidate as noise according to the cause of the erroneous parallax measurement. Thereafter, the in-vehicle environment recognition device 1 proceeds to Step S10.

The in-vehicle environment recognition device corrects the height and inclination of the flat road surface portion by using the re-measured parallax, and performs three-dimensional object detection processing of detecting a step present on the road based on the corrected flat road surface portion (Step S10). That is, the in-vehicle environment recognition device 1 identifies a step present on the road and a road surface marking based on the corrected flat road surface portion, and detects a step present at the road edge, a step such as a bump present on the traveling road surface, an obstacle present on the traveling road surface, and the like. In the matching correction processing in Step S09, an influence on detection performance for a step having a large height difference such as an obstacle, a hole, and a side groove present on the traveling road surface is small. On the other hand, the matching correction processing in Step S09 has a large influence on detection performance for a step having a small height difference (for example, a step having a height of about 5 cm) or a step such as a bump. That is, by the matching correction processing in Step S09, the in-vehicle environment recognition device 1 can greatly improve the detection performance for a step having a small height difference, a step such as a bump, or the like without substantially deteriorating the detection performance for a step having a large height difference.

The in-vehicle environment recognition device performs alarm control processing (Step S11). Specifically, the in-vehicle environment recognition device 1 outputs information necessary for vehicle traveling control, alarm notification, and the like to the control device of the vehicle based on the detection result of Step S10.

Thereafter, the in-vehicle environment recognition device 1 ends the surrounding environment recognition processing.

In the present embodiment, among the respective constituent elements included in the in-vehicle environment recognition device 1, the stereo matching unit 200, the step candidate extraction unit 300, the line segment candidate extraction unit 400, the analysis unit 500, and the three-dimensional object detection unit 600 are also collectively referred to as a "processing device". The processing device processes a pair of images acquired by the pair of cameras of the stereo camera unit 100. The processing device may further include the alarm control unit 700. The processing device may further include at least one of the exposure adjustment unit 120, the sensitivity calibration unit 130, the geometric calibration unit 140, or the edge generation unit 150 of the stereo camera unit 100. The processing device can perform the surrounding environment recognition processing illustrated in FIG. 18. The in-vehicle environment recognition device 1 can also be expressed as including the pair of cameras and the processing device.

In other words, the processing device is a processing device that processes at least a pair of images acquired by a pair of cameras mounted on a vehicle, and includes the stereo matching unit 200 that measures a parallax of the pair of images and generates a parallax image, the step candidate extraction unit 300 that extracts a step candidate of a road on which the vehicle travels from the parallax image generated by the stereo matching unit 200, the line segment candidate extraction unit 400 that extracts a line segment candidate from the images acquired by the pair of cameras, the analysis unit 500 that performs collation between the step candidate extracted by the step candidate extraction unit 300 and the line segment candidate extracted by the line segment candidate extraction unit 400 and analyzes validity of the step candidate based on the collation result and an inclination of the line segment candidate, and the three-dimensional object detection unit 600 that detects a step present on the road based on the analysis result of the analysis unit 500.

The processing device can analyze the validity of the step candidate based on the collation result and the inclination of the line segment candidate. As a result, the processing device can re-measure the parallax, correct the distance or eliminate the distance as noise for the step candidate overlapping with the line segment candidate, for which erroneous parallax measurement is likely to occur. The processing device can accurately reproduce only the step present on the road by using the three-dimensional point group constituting the step candidate. Therefore, the processing device can suppress erroneous detection due to erroneous parallax measurement and accurately detect the step present on the road.

Note that the processing device may be provided integrally with the pair of cameras. For example, the processing device may be provided in a housing of a stereo camera device including a pair of cameras installed on an inner side of a windshield of a vehicle. In addition, the processing device may be provided separately from the pair of cameras. For example, the processing device may be provided as a part of an electronic control unit that is one of the control devices of the vehicle.

[Others]

The present invention is not limited to the embodiments described above, but includes various modified examples. For example, the embodiments described above have been described in detail in order to explain the present invention in an easy-to-understand manner, and the present invention is not necessarily limited to those having all the configurations described. Further, a part of a configuration of an embodiment can be replaced with a configuration of another embodiment, and to a configuration of an embodiment, a configuration of another embodiment can be added. In addition, a part of the configuration of each embodiment can be added with another configuration, can be deleted, and can be replaced with another configuration.

In addition, some or all of the above-described configurations, functions, processing units, processing means, and the like may be implemented by hardware, for example, by designing with an integrated circuit. In addition, each of the above-described configurations, functions, and the like may be implemented by software in a manner in which a processor interprets and executes a program for implementing each function. Information such as a program, a tape, and a file for implementing each function can be stored in a recording device such as a memory, a hard disk, or a solid state drive (SSD), or a recording medium such as an IC card, an SD card, or a DVD.

In addition, the control lines and information lines indicate those that are considered necessary for explanation, and do not necessarily indicate all the control lines and information lines in the product. In practice, it can be considered that almost all configurations are interconnected.

REFERENCE SIGNS LIST

1 in-vehicle environment recognition device
100 stereo camera unit 200 stereo matching unit
300 step candidate extraction unit
400 line segment candidate extraction unit
500 analysis unit
600 three-dimensional object detection unit
700 alarm control unit

The invention claimed is:

1. A processing device comprising one or more memory devices having a program stored therein that, when executed by one or more processors, causes the one or more processors to process a pair of images acquired by a pair of cameras mounted on a vehicle, the one or more processors configured to acquire features of the pair of images and generate a feature image;

extract a step candidate of a road on which the vehicle travels from the feature image;

extract a line segment candidate from the pair of images;

perform collation between the step candidate and the line segment candidate;

analyze validity of the step candidate based on a collation result and an inclination of the line segment candidate; and detect a step present on the road based on an analysis result.

2. The processing device according to claim 1, wherein the one or more processors are configured to measure a parallax of the pair of images and generate a parallax image.

3. The processing device according to claim 2, wherein the one or more processors are configured to:

perform stereo matching processing to search for corresponding points of the pair of images in a direction connecting the pair of cameras, measure the parallax, classify the line segment candidate as a line segment candidate extending in a first direction in which the corresponding points are searched for, a line segment candidate extending in a second direction perpendicular to the first direction, and a line segment candidate extending in a third direction intersecting the first direction and the second direction according to the inclination of the line segment candidate, and determine that the validity of the step candidate is high in response to a determination that the step candidate does not overlap with the line segment candidate or in response to a determination that the step candidate overlaps with the line segment candidate extending in the second direction.

4. The processing device according to claim 2, wherein the one or more processors are configured to:

measure the parallax by performing stereo matching processing to search for corresponding points of the pair of images in a direction connecting the pair of cameras, classify the line segment candidate as a line segment candidate extending in a first direction in which the corresponding points are searched for, a line segment candidate extending in a second direction perpendicular to the first direction, and a line segment candidate extending in a third direction intersecting the first direction and the second direction according to the inclination of the line segment candidate, determine that the validity of the step candidate is low in response to a determination that the step candidate overlaps with the line segment candidate extending in the first direction or the third direction, analyze whether or not there is a possibility that the step candidate has been extracted due to erroneous parallax measurement based on arrangement of a three-dimensional point group constituting the step candidate, and correct a distance according to the parallax in response to a determination that there is a possibility that the step candidate has been extracted due to the erroneous parallax measurement.

5. The processing device according to claim 4, wherein the one or more processors are configured to:

in response to a determination that a plurality of straight lines passing through each three-dimensional point group constituting the step candidate and a viewpoint of at least one of the pair of cameras intersect each other or an interval between the plurality of straight lines is not uniform, determine that there is a possibility that the step candidate that overlaps with the line segment candidate extending in the first direction or the third direction and is constituted by the three-dimensional point group passing through the plurality of straight lines has been extracted due to the erroneous parallax measurement.

6. The processing device according to claim 4, wherein the one or more processors are configured to:

in response to a determination that a height of the three-dimensional point group constituting the step candidate from a road surface of the road randomly increases or decreases, determine that there is a possibility that the step candidate that overlaps with the line segment candidate extending in the first direction or the third direction and is constituted by the three-dimensional point group has been extracted due to the erroneous parallax measurement.

7. The processing device according to claim 4, wherein the one or more processors are configured to:

set a matching window in each of the pair of images to perform the stereo matching processing, generate a histogram of a cumulative value obtained by accumulating intensities of an edge having a luminance change in the matching window in the first direction and a histogram of a cumulative value obtained by accumulating intensities of the edge in the second direction, determine a barycenter position of a feature amount in the matching window based on a peak position of each generated histogram, and correct the distance by using the barycenter position in response to a determination that there is a possibility that the step candidate overlapping with the line segment candidate extending in the first direction or the third direction has been extracted due to the erroneous parallax measurement.

8. The processing device according to claim 4, wherein the one or more processors are configured to:

set a matching window in each of the pair of images to perform the stereo matching processing, and in response to a determination that there is a possibility that the step candidate overlapping with the line segment candidate extending in the first direction has been extracted due to the erroneous parallax measurement, increase a size of the matching window in the second direction until the line segment candidate extending in the second direction around the line segment candidate extending in the first direction enters the matching window, reset the matching window, perform the stereo matching processing again for the line segment candidate extending in the first direction by using the reset matching window, and correct the distance according to a result of the stereo matching processing performed again.

9. The processing device according to claim 4, wherein the one or more processors are configured to:

calculate similarity between a feature amount in a matching window set in one of the pair of images and a feature amount in a matching window set in the other of the pair of images to perform the stereo matching processing, and in response to a determination that there is a possibility that the step candidate overlapping with the line segment candidate extending in the first direction or the third direction has been extracted due to the erroneous parallax measurement, reset the matching window by shifting any one of the matching window set in one of the pair of images and the matching window set in the other of the pair of images by a predetermined amount in the second direction, perform the stereo matching processing again for the line segment candidate extending in the first direction or the third direction by using the reset matching window, compare the similarity in a case of using the reset matching window with the similarity in a case of using the matching window before resetting, and parallelize the pair of images based on a comparison result to correct the distance.

10. The processing device according to claim 4, wherein the one or more processors are configured to:

set a matching window in each of the pair of images to perform the stereo matching processing, and in response to a determination that there is a possibility that the step candidate overlapping with the line segment candidate extending in the first direction or the third direction has been extracted due to the erroneous parallax measurement, mask an edge having an edge intensity equal to or higher than a predetermined intensity among edges present in the matching window for the line segment candidate extending in the first direction or the third direction, perform the stereo matching processing again for the line segment candidate extending in the first direction or the third direction except for the masked edge, and correct the distance according to a result of the stereo matching processing performed again.

11. The processing device according to claim 4, wherein the one or more processors are configured to:

calculate similarity between a feature amount in a matching window set in one of the pair of images and a feature amount in a matching window set in the other of the pair of images to perform the stereo matching processing, and in response to a determination that there is a possibility that the step candidate overlapping with the line segment candidate extending in the first direction or the third direction has been extracted due to the erroneous parallax measurement, specify an angle of an edge present in the matching window for the line segment candidate extending in the first direction or the third direction, perform the stereo matching processing again for the line segment candidate extending in the first direction or the third direction by using the specified angle of the edge as the feature amount, and correct the distance according to a result of the stereo matching processing performed again.

12. The processing device according to claim 1, wherein the one or more processors are configured to output control information for controlling vehicle traveling or alarm notification to a control device of the vehicle based on a detection result.

* * * * *